(12) United States Patent
Lee et al.

(10) Patent No.: US 11,876,317 B2
(45) Date of Patent: Jan. 16, 2024

(54) ELECTRICAL CONNECTION DEVICE AND ELECTRONIC DEVICE COMPRISING SAME

(71) Applicant: Samsung Electronics Co., Ltd., Gyeonggi-do (KR)

(72) Inventors: Inha Lee, Gyeonggi-do (KR); Seoungho Jung, Gyeonggi-do (KR); Hanseok Mun, Gyeonggi-do (KR); Jaeryong Han, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 446 days.

(21) Appl. No.: 17/284,025

(22) PCT Filed: Oct. 18, 2019

(86) PCT No.: PCT/KR2019/013735
§ 371 (c)(1),
(2) Date: Apr. 9, 2021

(87) PCT Pub. No.: WO2020/091280
PCT Pub. Date: May 7, 2020

(65) Prior Publication Data
US 2021/0384662 A1 Dec. 9, 2021

(30) Foreign Application Priority Data

Oct. 29, 2018 (KR) .......... 10-2018-0129874

(51) Int. Cl.
*H05K 5/00* (2006.01)
*H01R 12/79* (2011.01)
*H01R 12/75* (2011.01)
*H01R 13/20* (2006.01)
*H04M 1/02* (2006.01)
*H01R 13/50* (2006.01)

(52) U.S. Cl.
CPC ............ *H01R 12/79* (2013.01); *H01R 12/75* (2013.01); *H01R 13/20* (2013.01); *H04M 1/0274* (2013.01); *H01R 13/50* (2013.01)

(58) Field of Classification Search
CPC ...................................... H05K 7/00
See application file for complete search history.

(56) References Cited

U.S. PATENT DOCUMENTS 7,168,986 B1  1/2007  Peng
9,887,473 B2 * 2/2018  Lee ...................... H01R 12/716
(Continued)

FOREIGN PATENT DOCUMENTS

CN       107394538 A    11/2017
KR   10-2014-0091431 A   7/2014
(Continued)

OTHER PUBLICATIONS

Korean Decision of Patent dated Apr. 26, 2023.
Korean Office Action dated Oct. 19, 2022.

*Primary Examiner* — Jerry Wu
(74) *Attorney, Agent, or Firm* — Cha & Reiter, LLC

(57) ABSTRACT

The present invention relates to an electrical connection device and an electronic device comprising same, wherein a receptacle includes a plurality of conductive terminals that are arranged to press a connector in different directions and induces stable contact when the connector is connected to the receptacle.

20 Claims, 11 Drawing Sheets

(56) References Cited

U.S. PATENT DOCUMENTS

2014/0364003 A1    12/2014  Yunoki
2015/0194753 A1*    7/2015  Raff .................... H01R 12/716
                                                          29/830
2017/0245386 A1     8/2017  Park

FOREIGN PATENT DOCUMENTS

| KR | 10-2014-0125298 A | 10/2014 |
| KR | 10-2014-0125300 A | 10/2014 |
| KR | 10-2014-0144137 A | 12/2014 |
| KR | 10-2015-0034520 A | 4/2015 |
| KR | 10-2015-0075029 A | 7/2015 |
| KR | 10-2016-0022604 A | 3/2016 |
| KR | 10-1610748 B1 | 4/2016 |
| KR | 10-2016-0080636 A | 7/2016 |
| KR | 10-1705076 B1 | 2/2017 |
| KR | 10-2017-0097917 A | 8/2017 |
| KR | 10-2018-0111144 A | 10/2018 |

* cited by examiner

ELECTRICAL CONNECTION DEVICE AND ELECTRONIC DEVICE COMPRISING SAME

CROSS REFERENCE TO RELATED APPLICATIONS

This application is a National Phase Entry of PCT International Application No. PCT/KR2019/013735, which was filed on Oct. 18, 2019, and claims a priority to Korean Patent Application No. 10-2018-0129874, which was filed on Oct. 29, 2018, the contents of which are incorporated herein by reference.

TECHNICAL FIELD

Various embodiments of the disclosure relate to an electrical connection device and an electronic device including the same.

BACKGROUND ART

In general, an electronic device may include therein multiple electronic components (an electronic function group). The electronic components may be arranged in the state of being spaced apart from each other at predetermined intervals in the electronic device. Such a spaced arrangement may be provided due to a mounting structure between respective components in an electronic device, or may be provided in order to prevent the performance of counterpart accessories from being degraded due to noise generated from each accessory.

For the electrical connection between at least two electronic components described above, it is necessary to add a separate electrical connection device. Such an electrical connection device should be excellent in durability even if the electronic device is used for a long period of time and external impacts are applied to the electronic device, and should perform stable and continuous signal transmission between counterpart electronic component.

DETAILED DESCRIPTION OF INVENTION

Technical Problem

An electronic device may have a configuration in which individual electronic components, which are arranged to be spaced apart from each other in an internal space, are electrically connected to each other in order to implement various functions. In such a case, a first electronic component and a second electronic component may be electrically connected to each other via an electrical connection device. For example, an electrical connection device may include a conductive cable having a predetermined length (e.g., a flexible printed circuit board (FPCB)), and two electronic components can be electrically connected to each other by bringing a connector (e.g., a plug) installed at an end of the conductive cable into physical contact with a receptacle provided on a counterpart electronic component.

Electronic devices are increasingly required to perform various functions. Thus, respective electronic components mounted in the internal spaces of the electronic devices may also be designed to perform various functions. Accordingly, an electrical connection device for electrically connecting respective electronic components to each other may also require a stable connection structure for transmitting data, the amount of which is gradually increasing, or high current. In order to transmit such data or power, conventional connectors and receptacles adopt single or double conductive terminals that are in physical contact with each other. However, when the connector is incorrectly coupled to the receptacle, conductive terminals are damaged by an external shock, or contact portions of the conductive terminals are misaligned even if the contact portions are connected, data and/or power may be unstably transmitted, which may in turn cause a malfunction of the electronic device, and a consequent problem of deteriorated reliability of the electronic device.

According to various embodiments of the disclosure, it is possible to provide an electrical connection device and an electronic device including the same.

Various embodiments of the disclosure is capable of providing an electrical connection device capable of stably transmitting high-capacity data and/or high current by inducing a stable contact, and an electronic device including the same.

Various embodiments of the disclosure is capable of providing an electrical connection device, which is helpful for preventing damage or deformation, which may be caused due to frequent attaching and detaching operations or external impacts, and an electronic device including the same.

Solution to Problem

According to various embodiments, an electronic device may include: a housing; a printed circuit board (PCB) disposed inside the housing; and a receptacle mounted on the printed circuit board, wherein the receptacle may include: a base structure including a first surface facing away from the printed circuit board, a second surface facing away from the first surface and mounted on the printed circuit board, and a side surface surrounding a space between the first surface and the second surface, wherein the side surface may include: a first side surface, a second side surface extending from the first side surface in a vertical direction, a third side surface extending from the second side surface in a direction parallel to the first side surface, and a fourth side surface extending from the third side surface in a direction parallel to the second side surface, and wherein the base structure may include an edge area and an island area defined by a recess having a predetermined depth from the first surface toward the second surface; multiple first conductive terminals disposed side by side between the first side surface and the island area and between the third side surface and the island area, respectively; a first conductive member disposed between the first multiple conductive terminals and the second side surface, wherein the first conductive member may include: a first portion disposed in the edge area adjacent to the second side surface, a second portion extending from at least a portion of the first portion to a portion of the edge area adjacent to the first side surface, a third portion extending from at least a portion of the first portion to a portion of the edge area adjacent to the third side surface, a fourth portion extending from at least a portion of the first portion to the recess, a fifth portion extending from at least a portion of the fourth portion to at least a portion of the island area, a pair of second conductive terminals extending from at least a portion of the fourth portion toward the first side surface and the second side surface, respectively, and a pair of third conductive terminals extending from the second portion and the third portion, respectively, toward the island area, and wherein, when a connector is connected to the receptacle, the second conductive terminals and the third conductive terminals are disposed to provide pressing forces to the connector in opposite directions.

According to various embodiments, a receptacle to be coupled with a connector may include: a base structure including a first surface facing away from the printed circuit board, a second surface facing away from the first surface and mounted on the printed circuit board, and a side surface surrounding a space between the first surface and the second surface, wherein the side surface may include: a first side surface, a second side surface extending from the first side surface in a vertical direction, a third side surface extending from the second side surface in a direction parallel to the first side surface, and a fourth side surface extending from the third side surface in a direction parallel to the second side surface, and wherein the base structure may include an edge area and an island area defined by a recess having a predetermined depth from the first surface toward the second surface; multiple first conductive terminals disposed side by side between the first side surface and the island area and between the third side surface and the island area, respectively; a first conductive member disposed between the first multiple conductive terminals and the second side surface, wherein the first conductive member may include: a first portion disposed in the edge area adjacent to the second side surface, a second portion extending from at least a portion of the first portion to a portion of the edge area adjacent to the first side surface, a third portion extending from at least a portion of the first portion to a portion of the edge area adjacent to the third side surface, a fourth portion extending from at least a portion of the first portion to the recess, a fifth portion extending from at least a portion of the fourth portion to at least a portion of the island area, a pair of second conductive terminals extending from at least a portion of the fourth portion toward the first side surface and the second side surface, respectively, and a pair of third conductive terminals extending from the second portion and the third portion, respectively, toward the island area, and wherein, when the connector is connected to the receptacle, the second conductive terminals and the third conductive terminals may be disposed to provide pressing forces to the connector in opposite directions.

According to various embodiments, a receptacle to be coupled to a connector may include: a base structure including a first surface, a second surface facing away from the first surface and mounted on a printed circuit board, and a side surface surrounding a space between the first surface and the second surface, wherein the side surface may include: a first side surface, a second side surface extending from the first side surface in a vertical direction, a third side surface extending from the second side surface in a direction parallel to the first side surface, and a fourth side surface extending from the third side surface in a direction parallel to the second side surface, and wherein the base structure may include an edge area and an island area defined by a recess having a predetermined depth from the first surface toward the second surface; multiple first conductive terminals disposed side by side between the first side surface and the island area and between the third side surface and the island area, respectively; a first conductive member disposed between the first multiple conductive terminals and the second side surface, wherein the first conductive member may include: a first portion disposed in the edge area adjacent to the second side surface, a second portion extending from at least a portion of the first portion to a portion of the edge area adjacent to the first side surface, a third portion extending from at least a portion of the first portion to a portion of the edge area adjacent to the third side surface, a fourth portion extending from at least a portion of the first portion to the recess, and a fifth portion extending from at least a portion of the fourth portion to at least a portion of the island area, a pair of second conductive terminals extending from at least a portion of the fourth portion toward the first side surface and the second side surface, respectively, and a pair of third conductive terminals extending from the second portion and the third portion, respectively, toward the island area; and a second conductive member disposed between the first multiple conductive terminals and the fourth side surface, wherein the second conductive member may include: a sixth portion disposed in the edge area adjacent to the fourth side surface, a seventh portion extending from at least a portion of the sixth portion to a portion of the edge area adjacent to the first side surface, an eighth portion extending from at least a portion of the sixth portion to a portion of the edge area adjacent to the third side surface, a ninth portion extending from at least a portion of the sixth portion to the recess, a tenth portion extending from at least a portion of the ninth portion to at least a portion of the island area, a pair of fourth conductive terminals extending from at least a portion of the ninth portion toward the first side surface and the second side surface, respectively, and a pair of fifth conductive terminals extending from the seventh portion and the eighth portion, respectively, toward the island area, and wherein, when the connector is connected to the receptacle, the second conductive terminals and the third conductive terminals may be disposed to provide pressing forces to the connector in opposite directions, and when the connector is connected to the receptacle, the fourth conductive terminals and the fifth conductive terminals are disposed to provide pressing forces to the connector in opposite directions.

Advantageous Effects of Invention

The receptacle according to various embodiments of the disclosure includes multiple conductive terminals arranged to press the connector in different directions so as to induce stable contact. Thus, it is possible to reliably transmit large amounts of data and/or high current. Further, at least a portion of the area around the conductive terminals is molded in the base member through insert injection molding, which is helpful for preventing damage or deformation, which may be caused due to frequent attaching and detaching operations or external impacts.

BRIEF DESCRIPTION OF DRAWINGS

In connection with the description of the drawings, the same or similar components may be denoted by the same or similar reference numerals.

MODE FOR CARRYING OUT THE INVENTION

Figure 1:
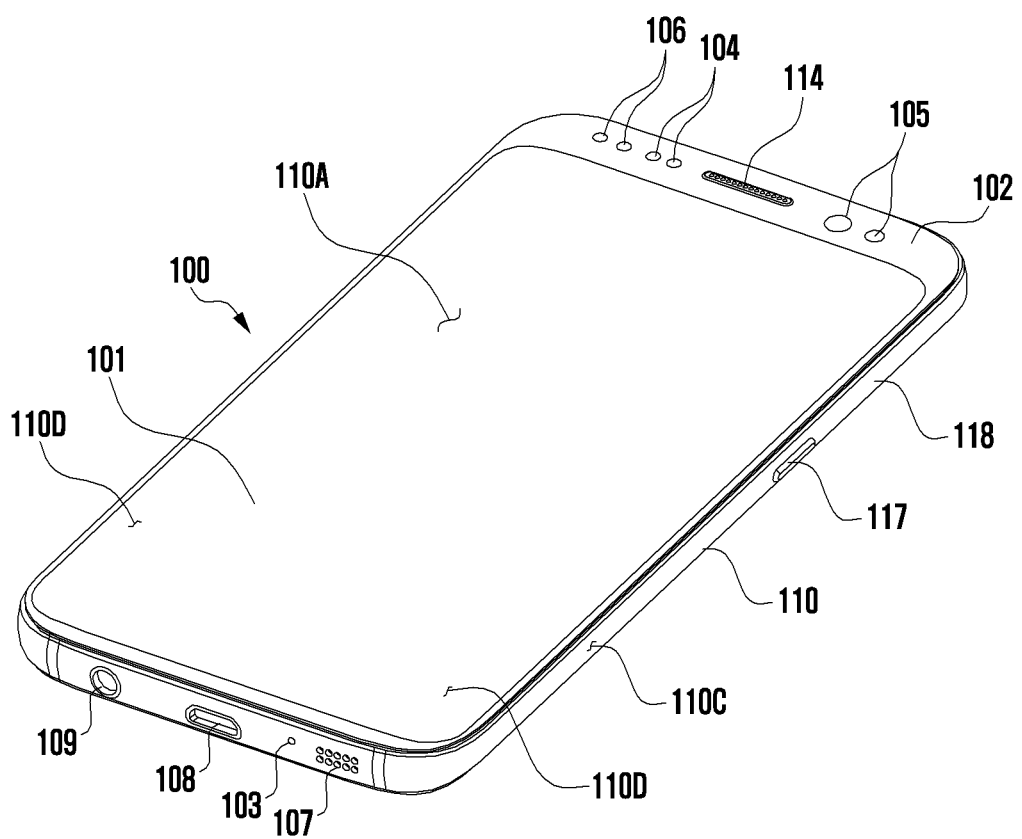
FIG. 1 is a front perspective view illustrating a mobile electronic device according to various embodiments of the disclosure.
Figure 2:
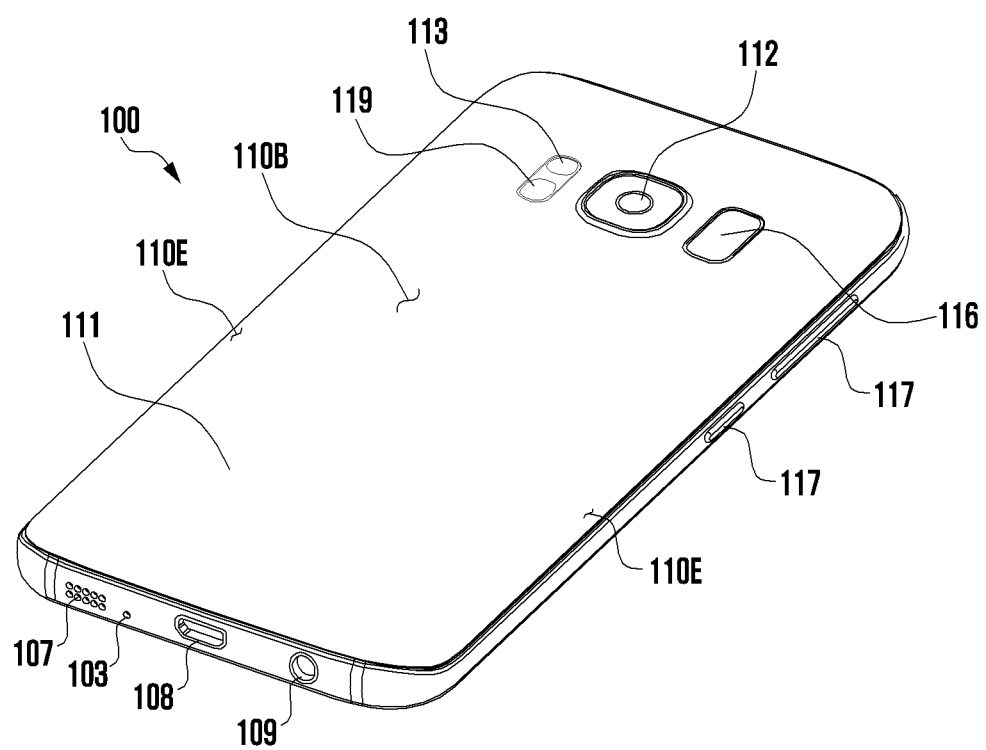
FIG. 2 is a rear perspective view illustrating the electronic device of FIG. 1 according to various embodiments of the disclosure.

FIG. 1 is a perspective view illustrating a front surface of a mobile electronic device according to an embodiment of the disclosure. FIG. 2 is a perspective view illustrating a rear surface of the electronic device of FIG. 1 according to an embodiment of the disclosure.

Referring to FIGS. 1 and 2, according to an embodiment, an electronic device 100 may include a housing 110 that includes a first surface (or front surface) 110A, a second surface (or rear surface) 110B, and a lateral surface 110C that surrounds a space between the first surface 110A and the second surface 110B. According to another embodiment, the housing 110 may refer to a structure that forms a part of the first surface 110A, the second surface 110B, and the lateral surface 110C. According to an embodiment, the first surface 110A may be formed of a front plate 102 (e.g., a glass plate or polymer plate coated with a variety of coating layers) at least a part of which is substantially transparent. The second surface 110B may be formed of a rear plate 111 which is substantially opaque. The rear plate 111 may be formed of, for example, coated or colored glass, ceramic, polymer, metal (e.g., aluminum, stainless steel (STS), or magnesium), or any combination thereof. The lateral surface 110C may be formed of a lateral bezel structure (or "lateral member") 118 which is combined with the front plate 102 and the rear plate 111 and includes a metal and/or polymer. The rear plate 111 and the lateral bezel structure 118 may be integrally formed and may be of the same material (e.g., a metallic material such as aluminum).

In the shown embodiment, the front plate 102 may include two first regions 110D disposed at long edges thereof, respectively, and bent and extended seamlessly from the first surface 110A toward the rear plate 111. In the shown embodiment, the rear plate 111 may include two second regions 110E disposed at long edges thereof, respectively, and bent and extended seamlessly from the second surface 110B toward the front plate 102 (refer to FIG. 2). In various embodiments, the front plate 102 (or the rear plate 111) may include only one of the first regions 110D (or of the second regions 110E). In various embodiments, the first regions 110D or the second regions 110E may be omitted in part. In the embodiments, when viewed from a lateral side of the electronic device 100, the lateral bezel structure 118 may have a first thickness (or width) on a lateral side where one of the first regions 110D or one of the second regions 110E is not included, and may have a second thickness, being less than the first thickness, on another lateral side where one of the first regions 110D or one of the second regions 110E is included.

According to an embodiment, the electronic device 100 may include at least one of a display 101, audio modules 103, 107 and 114, sensor modules 104, 116 and 119, camera modules 105, 112 and 113, key input devices 117, a light emitting device 106, and connector holes 108 and 109. In various embodiments, the electronic device 100 may omit at least one (e.g., the key input devices 117 or the light emitting device 106) of the above components, or may further include other components.

The display 101 may be exposed through a substantial portion of the front plate 102, for example. In various embodiments, at least a part of the display 101 may be exposed through the front plate 102 that forms the first surface 110A and the first regions 110D. In various embodiments, outlines (i.e., edges and corners) of the display 101 may have substantially the same form as those of the front plate 102. In another embodiment (not shown), the spacing between the outline of the display 101 and the outline of the front plate 102 may be substantially unchanged in order to enlarge the exposed area of the display 101. In another embodiment (not shown), a recess or opening may be formed in a portion of a display area of the display 101 to accommodate at least one of the audio modules (e.g., the audio module 114), the sensor module 104, the camera module 105, and the light emitting device 106. In another embodiment (not shown), at least one of the audio modules (e.g., the audio module 114), the sensor module 104, the camera module 105, the sensor module 116 (e.g., a fingerprint sensor), and the light emitting device 106 may be disposed on the back of the display area of the display 101. In another embodiment (not shown), the display 101 may be combined with, or adjacent to, a touch sensing circuit, a pressure sensor capable of measuring the touch strength (pressure), and/or a digitizer for detecting a stylus pen. In various embodiments, at least a part of the sensor modules 104 and 119 and/or at least a part of the key input devices 117 may be disposed in one of the first regions 110D and/or one of the second regions 110E.

The audio modules 103, 107 and 114 may correspond to a microphone hole (e.g., the audio module 103) and speaker holes (e.g., the audio modules 107 and 114). The microphone hole may contain a microphone disposed therein for acquiring external sounds and, in a case, contain a plurality of microphones to sense a sound direction. The speaker holes may be classified into an external speaker hole and a call receiver hole. In various embodiments, the microphone hole and the speaker holes may be implemented as a single hole, or a speaker (e.g., a piezo speaker) may be provided without the speaker holes.

The sensor modules 104, 116 and 119 may generate electrical signals or data corresponding to an internal operating state of the electronic device 100 or to an external environmental condition. The sensor modules 104, 116 and 119 may include a first sensor module (e.g., the sensor module 104) (e.g., a proximity sensor) and/or a second sensor module (e.g., a fingerprint sensor) disposed on the first surface 110A of the housing 110, and/or a third sensor module (e.g., the sensor module 119) (e.g., a heart rate monitor (HRM) sensor) and/or a fourth sensor module (e.g., the sensor module 116) (e.g., a fingerprint sensor) disposed on the second surface 110B of the housing 110. The fingerprint sensor may be disposed on the second surface 110B as well as the first surface 110A (e.g., the display 101) of the housing 110. The electronic device 100 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 105, 112 and 113 may include a first camera device (e.g., the camera module 105) disposed on the first surface 110A of the electronic device 100, and a second camera device (e.g., the camera module 112) and/or a flash (e.g., the camera module 113) disposed on the second surface 110B. The camera module 105 or the camera module 112 may include one or more lenses, an image sensor, and/or an image signal processor. The flash may include, for example, a light emitting diode or a xenon lamp. In various embodiments, two or more lenses (infrared cameras, wide angle and telephoto lenses) and image sensors may be disposed on one side of the electronic device 100.

The key input devices 117 may be disposed on the lateral surface 110C of the housing 110. In another embodiment, the electronic device 100 may not include some or all of the key input devices 117 described above, and the key input devices 117 which are not included may be implemented in another form such as a soft key on the display 101. In various embodiments, the key input devices 117 may include the sensor module 116 disposed on the second surface 110B of the housing 110.

The light emitting device 106 may be disposed on the first surface 110A of the housing 110, for example. For example, the light emitting device 106 may provide status information of the electronic device 100 in an optical form. In various embodiments, the light emitting device 106 may provide a light source associated with the operation of the camera module 105. The light emitting device 106 may include, for example, a light emitting diode (LED), an infrared (IR) LED, or a xenon lamp.

The connector holes 108 and 109 may include a first connector hole (e.g., the connector hole 108) adapted for a connector (e.g., a universal serial bus (USB) connector) for transmitting and receiving power and/or data to and from an external electronic device, and/or a second connector hole (e.g., the connector hole 109) adapted for a connector (e.g., an earphone jack) for transmitting and receiving an audio signal to and from an external electronic device.

Figure 3:
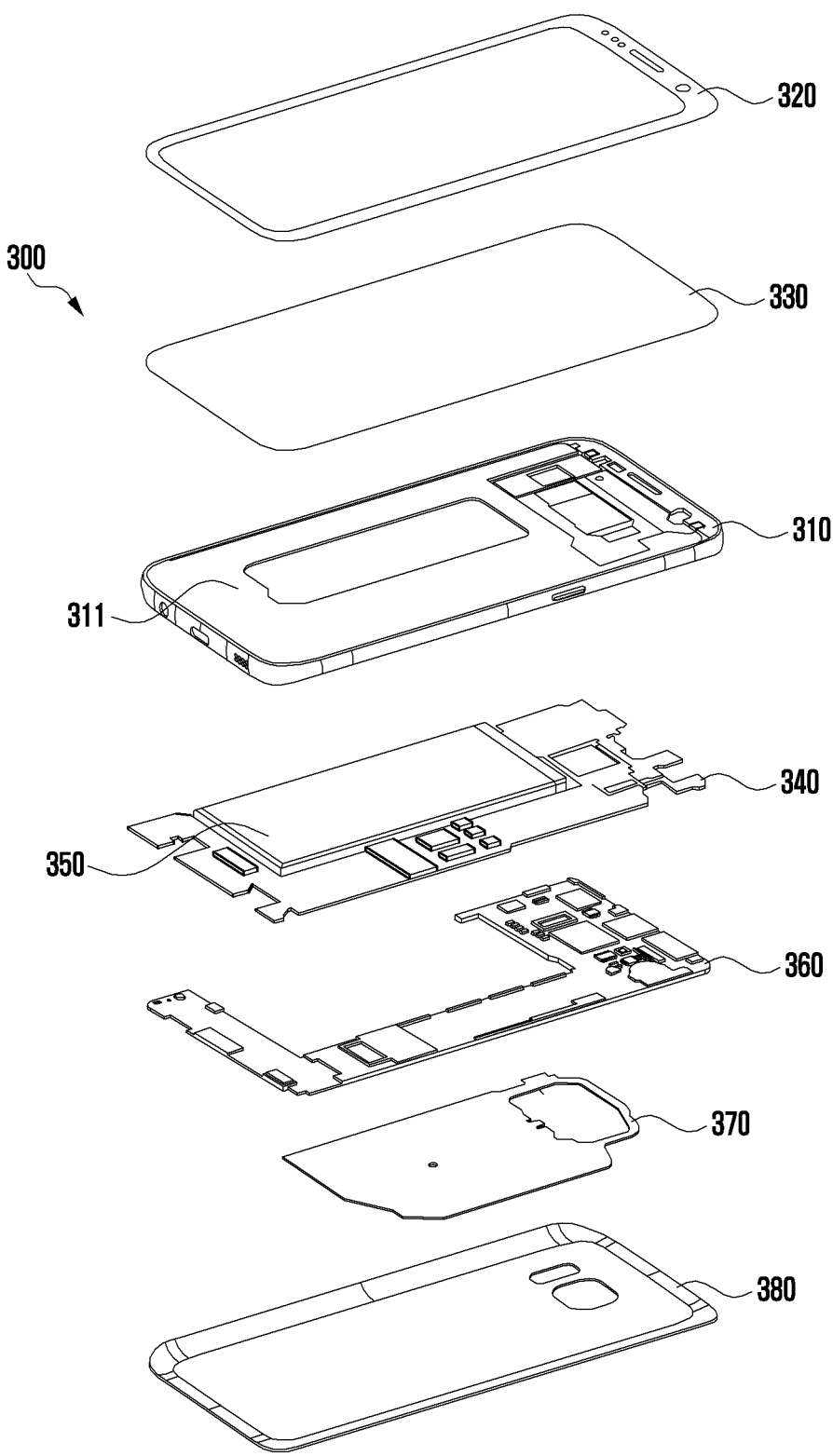
FIG. 3 is an exploded perspective view illustrating the electronic device of FIG. 1 according to various embodiments of the disclosure.

FIG. 3 is an exploded perspective view illustrating the electronic device of FIG. 1 according to an embodiment of the disclosure.

Referring to FIG. 3, an electronic device 300 (e.g., the electronic device 100 of FIG. 1) may include a lateral bezel structure 310, a first support member 311 (e.g., a bracket), a front plate 320, a display 330 (e.g., the display 101), a printed circuit board (PCB) 340, a battery 350, a second support member 360 (e.g., a rear case), an antenna 370, and a rear plate 380. In various embodiments, the electronic device 300 may omit at least one (e.g., the first support member 311 or the second support member 360) of the above components or may further include another component. Some components of the electronic device 300 may be the same as or similar to those of the electronic device 100 shown in FIG. 1 or FIG. 2, thus, descriptions thereof are omitted below.

The first support member 311 is disposed inside the electronic device 300 and may be connected to, or integrated with, the lateral bezel structure 310. The first support member 311 may be formed of, for example, a metallic material and/or a non-metal (e.g., polymer) material. The first support member 311 may be combined with the display 330 at one side thereof and also combined with the PCB 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, volatile memory or non-volatile memory.

The interface may include, for example, a high definition multimedia interface (HDMI), a USB interface, a secure digital (SD) card interface, and/or an audio interface. The interface may electrically or physically connect the electronic device 300 with an external electronic device and may include a USB connector, an SD card/multimedia card (MMC) connector, or an audio connector.

The battery 350 is a device for supplying power to at least one component of the electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the electronic device 300, and may be detachably disposed from the electronic device 300.

The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 310 and/or the first support member 311.

Figure 4:
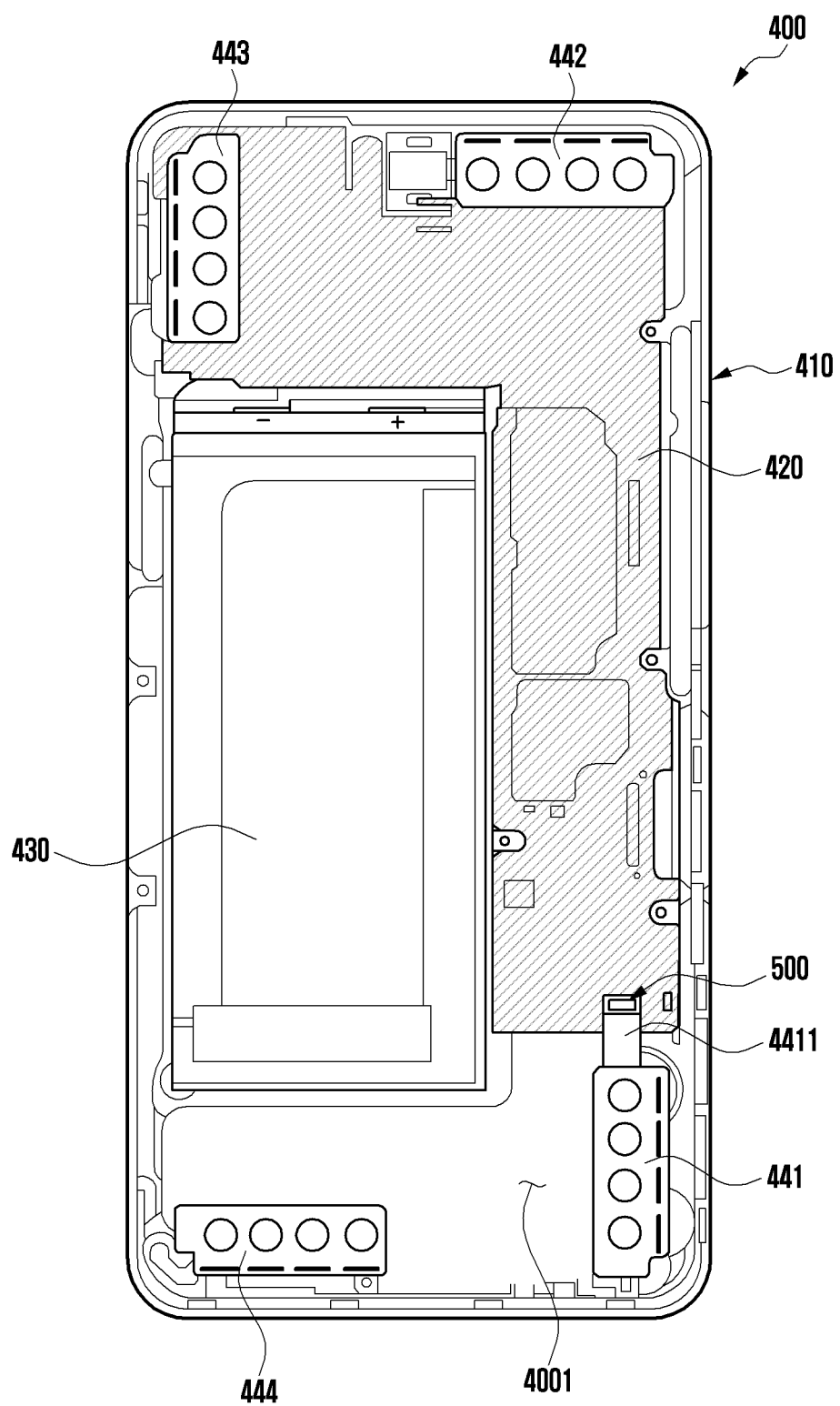
FIG. 4 is a view illustrating the configuration of an electronic device to which an electrical connection device according to various embodiments of the disclosure is applied.

FIG. 4 is a view illustrating the configuration of an electronic device 400 to which an electrical connection device 500 according to various embodiments of the disclosure is applied.

The electronic device 400 of FIG. 4 may be at least partially similar to the electronic device 100 in FIGS. 1 and 2 or the electronic device 300 of FIG. 3, or may include another embodiment of the same.

In this drawing, the electrical connection device 500 is applied for electrical connection between antenna modules 441, 442, 443, and 444 and a printed circuit board 420, but the disclosure is not limited thereto. In another embodiment, the electrical connection device 500 may be used for electrical connection between the printed circuit board 420 and a battery 430 disposed in the internal space 4001 of the electronic device 400. In another embodiment, the electrical connection device 500 may be used for mutual electrical connection between the aforementioned various electronic components disposed in the internal space 4001 of the electronic device 400.

Referring to FIG. 4, the electronic device 400 may include multiple electronic components disposed in an inner space 4001 defined by a side bezel structure 410 (e.g., a side member, a side frame, or a side housing). According to an embodiment, the multiple electronic components include a printed circuit board 420, a first antenna module 441 (e.g., a first antenna structure), a second antenna module 442 (e.g., a second antenna structure), a third antenna module 443 (e.g., a third antenna structure), a fourth antenna module 444 (e.g., a fourth antenna structure), or a battery 430. According to an embodiment, the printed circuit board 420 may be disposed so as to avoid the battery 430 or the antenna modules 441, 442, 443, and 444 or so as to overlap at least a portion of the battery 430 or the antenna modules 441, 442, 443, and 444.

According to various embodiments, the electronic device 400 may include a conductive cable 4411 disposed in order to electrically connect the printed circuit board 420 to the first antenna module 441 spaced apart from the printed circuit board 420. According to an embodiment, the conductive cable 4411 may include a coaxial cable for reducing the loss of RF signals of the first antenna module 441 and securing the performance of the first antenna module 441. In another embodiment, the conductive cable 4411 may include a flexible printed circuit board (FPCB). In another embodiment, the conductive cable 4411 may include an FPCB-type RF cable. According to an embodiment, the electronic device 400 may include an electrical connection device 500 disposed in a connection portion between the conductive cable 4411 and the printed circuit board 420 so as to electrically connect the printed circuit board 420 and the first antenna 441 to each other. According to an embodiment, the electrical connection device 500 may include a receptacle (e.g., the receptacle 510 in FIG. 5) disposed on the printed circuit board 420 and the first antenna module 441, and a connector (e.g., the connector 520 in FIG. 5) (e.g., a plug) installed to be electrically connected to an end of the conductive cable 4411 and detachably coupled to the receptacle (e.g., the receptacle 510 in FIG. 5). According to an embodiment, at least a portion of the receptacle (e.g., the receptacle 510 in FIG. 5) and at least a portion of the connector (e.g., the connector 520 in FIG. 5) are formed of a conductive material, and may be coupled by an operator when the electronic device 400 is assembled.

According to various embodiments of the disclosure, the electrical connection device 500 may include a receptacle (e.g., the receptacle 510 of FIG. 5) including at least one conductive member performing at least one function, and each conductive member may include multiple conductive terminals, which, when a connector (e.g., the connector 520 in FIG. 5) is coupled thereto, press the connector in opposite directions, thereby inducing stable physical contact.

Figure 5:
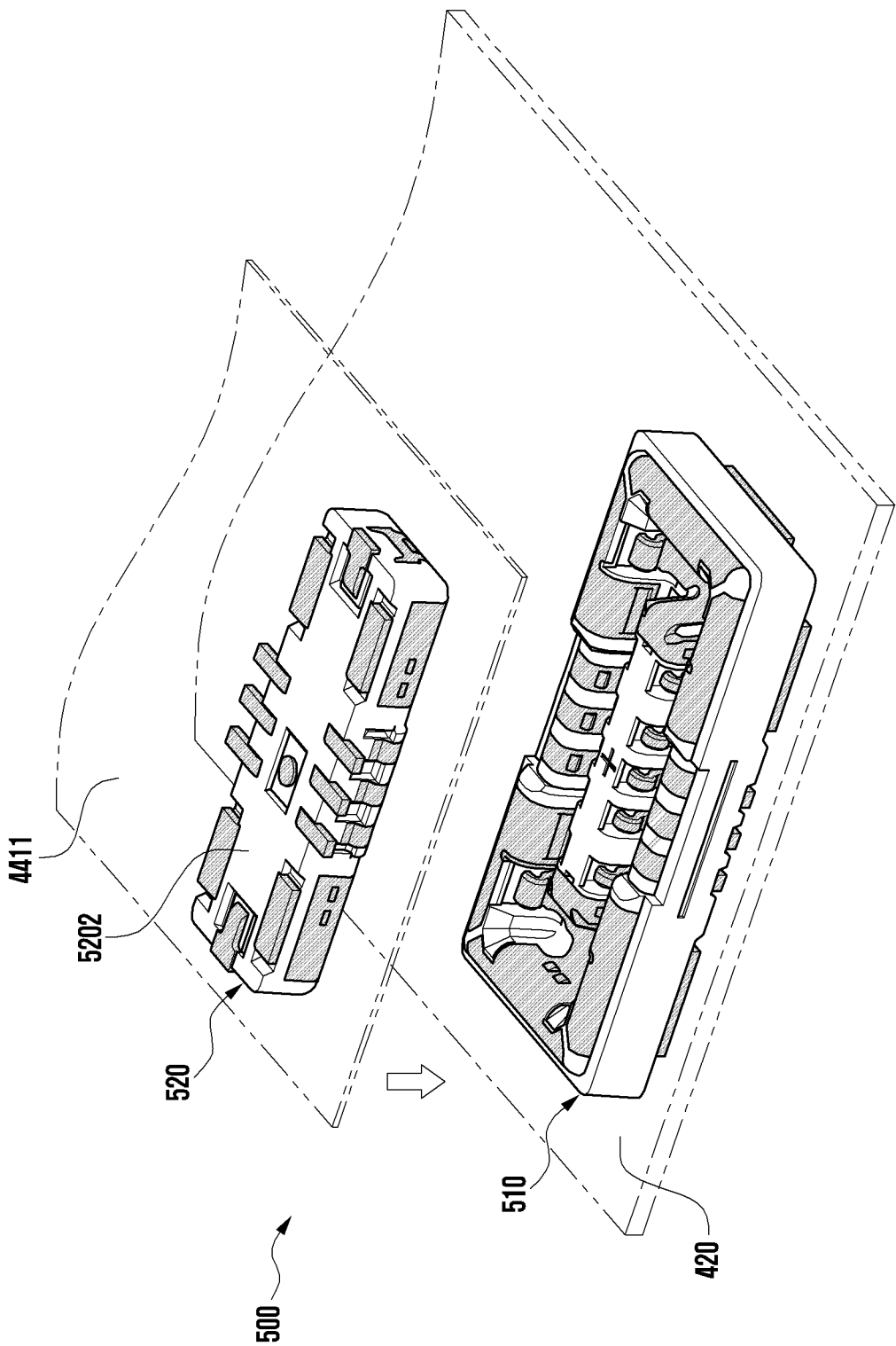
FIG. 5 is a perspective view illustrating the electrical connection device according to various embodiments of the disclosure in a disassembled state.

FIG. 5 is a perspective view illustrating the electrical connection device 500 according to various embodiments of the disclosure in a disassembled state.

Referring to FIG. 5, the electrical connection device 500 may include a receptacle 510 and a connector 520 electrically connected to the receptacle 510. According to an embodiment, the receptacle 510 may be mounted on the printed circuit board 420 disposed inside an electronic device (e.g., the electronic device 400 in FIG. 4). According to an embodiment, the connector 520 may be mounted at an end of a conductive cable (e.g., the conductive cable 4411 in FIG. 4) having a predetermined length drawn out from an antenna module (e.g., the first antenna module 441 in FIG. 4) disposed inside an electronic device (e.g., the electronic device 400 in FIG. 4). According to an embodiment, the antenna module (e.g., the first antenna module 441 in FIG. 4) may include at least one antenna radiator for 5G communication for transmitting a high-frequency signal. According to an embodiment, the electrical connection device 500 may have a coupling structure in which the receptacle 510 and the connector 520 are physically coupled to each other, and multiple conductive terminals and at least one conductive member may be disposed inside the coupling structure. The electrical connection device 500 may be electrically connected when a printed circuit board 420 and an antenna module (e.g., the first antenna module 441 in FIG. 4) in an electronic device (e.g., the electronic device 400 in FIG. 4) are disposed at appropriate positions spaced apart from each other and the connector 520 is then connected to the receptacle 510.

Figure 6A:
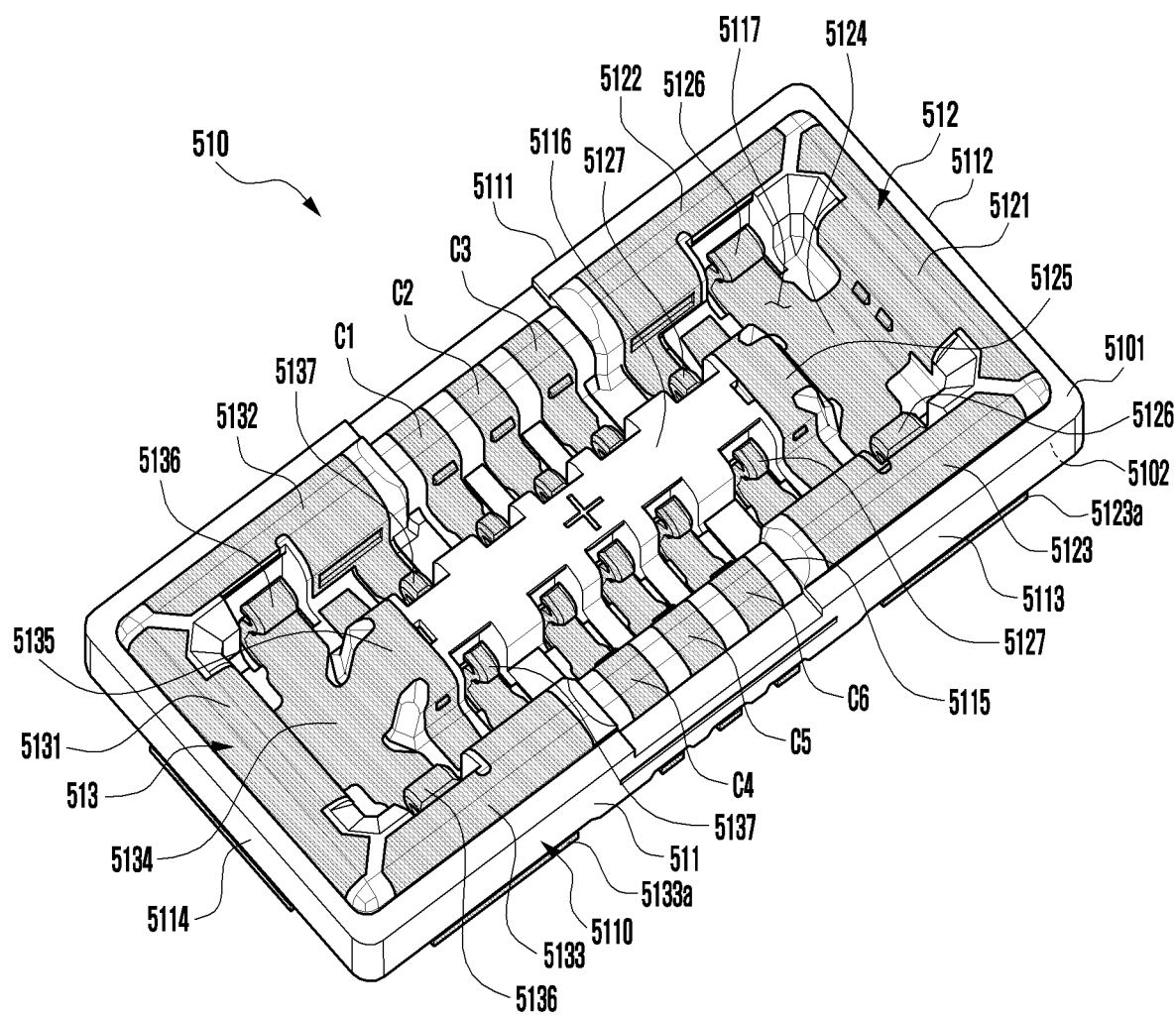
FIGS. 6A and 6B are views each illustrating the configuration of a receptacle according to various embodiments of the disclosure.
Figure 6B:
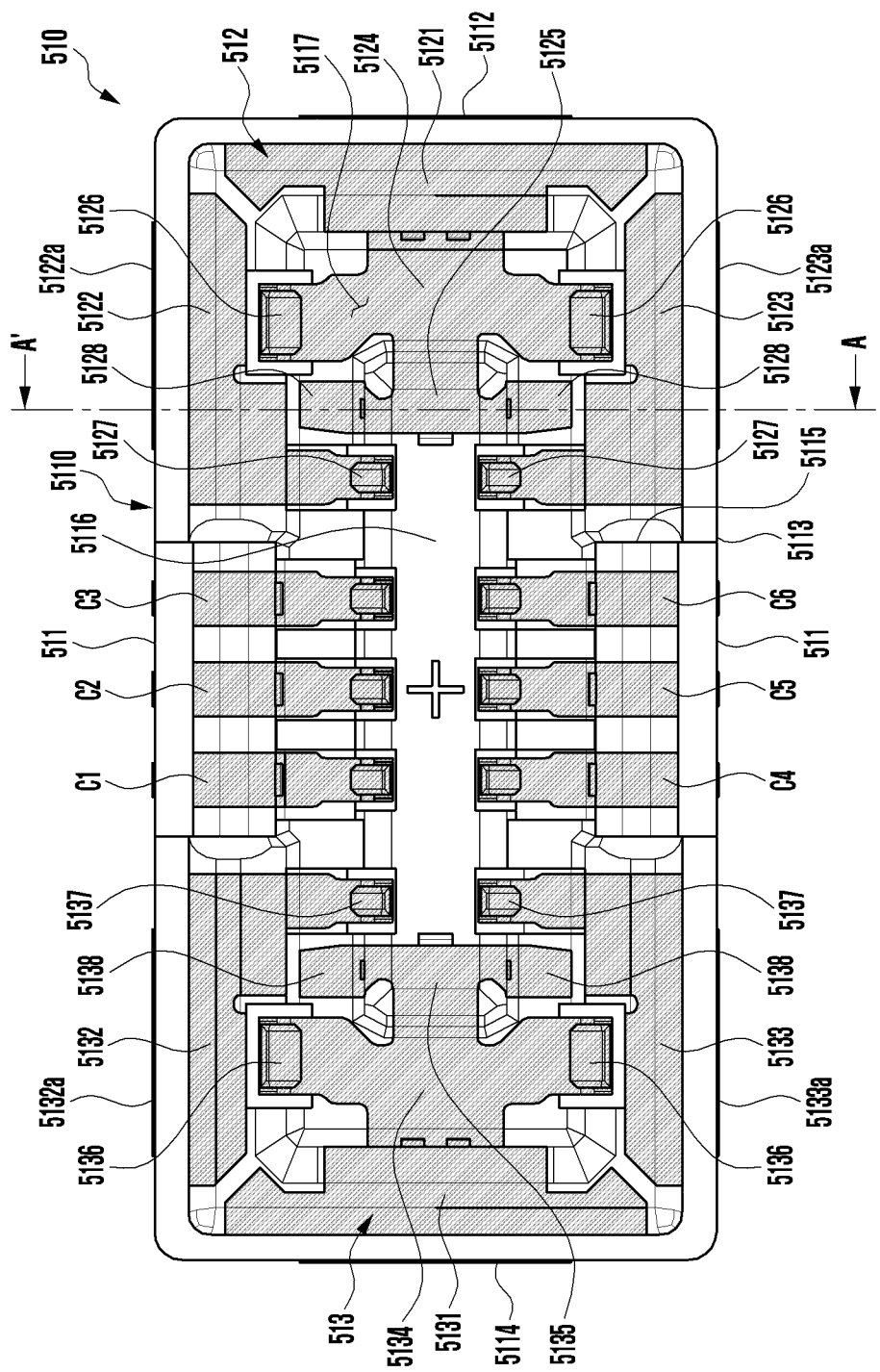

FIGS. 6A and 6B are views each illustrating the configuration of a receptacle 510 according to various embodiments of the disclosure.

Referring to FIGS. 6A and 6B, the receptacle 510 may include a base structure 5110 including a first surface 5101 facing away from a printed circuit board (e.g., the printed circuit board 420 in FIG. 5), a second surface 5102 facing away from the first surface 5101 and mounted on the printed circuit board (e.g., the printed circuit board 420 in FIG. 5), and a side surface 511 surrounding the space between the first surface 5101 and the second surface 5102. According to an embodiment, the base structure 5110 may be a mold structure capable of being fabricated through insert injection molding. According to an embodiment, the base structure 5110 may be made of an insulating material. According to an embodiment, the side surface 511 may include a first side surface 5111 having a first length, a second side surface 5112 extending in a vertical direction from the first side surface 5111 and having a second length shorter than the first length, a third side surface 5113 extending from the second side surface 5112 parallel to the first side surface 5111 and having the first length, and a fourth side surface 5114 extending from the third side surface 5113 parallel to the second side surface 5112 and having the second length. In another embodiment, when the base structure 5110 has a square shape, the first side surface 5111, the second side surface 5112, the third side surface 5113, and the fourth side surface 5114 may have the same length. In another embodiment, the base structure 5110 may have various shapes corresponding to the connection profile of the connector 520 to be electrically connected thereto. According to an embodiment, the base structure 5110 may include a recess 5117 having a predetermined depth from the first side surface 5111 toward the second surface 5102. According to an embodiment, the base structure 5110 may include an edge area 5115 and an island area 5116 defined by the recess 5117.

According to various embodiments, the receptacle 510 may include multiple first conductive terminals C1 to C6 disposed on the base structure 5110. According to an embodiment, among the first multiple conductive terminals C1 to C6, some conductive terminals C1 to C3 may be disposed side by side in the longitudinal direction between a peripheral edge area 5115 of the first side surface 5111 and the island area 5116. According to an embodiment, among the first multiple conductive terminals C1 to C6, some conductive terminals C4 to C6 may be disposed side by side in the longitudinal direction between a peripheral edge area 5115 of the third side surface 5113 and the island area 5116. According to an embodiment, at least one of the multiple first conductive terminals C1 to C6 may be used for transmitting high-frequency RF signals or general signals or for grounding a printed circuit board (e.g., the printed circuit board 420 in FIG. 5).

According to various embodiments, the receptacle 520 may include a first conductive member 512 and a second conductive member 513, which are respectively disposed on the opposite sides of the base structure 5110, with the first multiple conductive terminals C1 to C6 interposed therebetween. According to an embodiment, the first conductive member 512 and/or the second conductive member 513 may be used as a medium for transmitting power. According to an embodiment, the first conductive member 512 and/or the second conductive member 513 may be used as a medium for transmitting a signal. According to an embodiment, the first conductive member 512 may have the same structure as the second conductive member 513, and may be disposed symmetrically with the second conductive member 513, with the first multiple conductive terminals C1 to C6 interposed therebetween.

According to various embodiments, the first conductive member 512 may include a first portion 5121 disposed through the edge area 5115 adjacent to the second side surface 5112, a second portion 5122 extending from at least a portion of the first portion 5121 to at least a portion of the edge area 5115 adjacent to the first side surface 5111, a third portion 5123 extending from at least a portion of the first portion 5121 and disposed through the edge area 5115 adjacent to the third side surface 5113, a fourth portion 5124 extending from at least a portion of the first portion 5121 to the recess 5117, and a fifth portion 5125 extending from at least a portion of the fourth portion 5124 to at least a portion of the island area 5116. According to an embodiment, the first conductive member 512 may include a pair of second conductive terminals 5126 extending from at least a portion of the fourth portion 5124 toward the first side surface 5111 and the third side surface 5113, respectively. According to an embodiment, the first conductive member 512 may include a pair of third conductive terminals 5127 extending from at least a portion of the second portion 5122 and the third portion 5123, respectively, toward the island area 5116.

According to various embodiments, at least a portion of the first conductive member 512 may be molded in the base member 5110 through insert injection molding so as to be disposed inside the base member 5110 and to be invisible to the naked eye. For example, at least a portion of each of the first portion 5121, the second portion 5122, the third portion 5123, and the fifth portion 5125 may be molded inside the base member 5110 through insert injection molding. According to an embodiment, at least a portion of each of the first portion 5121, the second portion 5122, and the third portion 5123 may include an exposed portion 5121a, 5122a, or 5123a, which extends through the second surface 5102 of the base member 5110 to be exposed. According to an embodiment, the base member 5110 may be fixed in such a manner that the exposed portions 5121a, 5122a, and 5123a are soldered at corresponding positions of the printed circuit board (e.g., the printed circuit board 420 in FIG. 5).

According to various embodiments, when a connector (e.g., the connector 520 in FIG. 6C) is coupled with the receptacle 510, the connector (e.g., the connector 520 in FIG. 6C) may be disposed between the pair of second conductive terminals 5126. At the same time, the pair of third conductive terminals 5127 may be accommodated in an island-seating portion (e.g., the island-seating portion 5216 in FIG. 6C) of a connector (e.g., the connector 520 in FIG. 6C). Therefore, the pair of second conductive terminals 5126 are pushed outward by the connector side surface of the connector (e.g., the connector side surface 521 in FIG. 6C), and thus, as restoring forces acting opposite thereto, pressing forces may be applied in directions (in the direction C)) facing each other. The pair of third conductive terminals 5127 are pushed outward by the inner surfaces of the island-seating portion (e.g., the island-seating portion 5216 in FIG. 6C) of the connector (e.g., the connector 520 in FIG. 6C), and thus, as restoring forces acting opposite thereto, pressing forces may be applied in directions (in the direction C)) away from each other. According to an exemplary embodiment of the disclosure, the first conductive member 512 is electrically connected in a multi-contact manner such that the pair of second conductive terminals 5126 and the pair of third conductive terminals 5127 press the connector (e.g., the connector 520 in FIG. 6C) mounted in the receptacle 510, in opposite directions, which may be helpful in achieving a stable electrical connection.

According to various embodiments, the second conductive member 513 may include a sixth portion 5131 disposed through the edge area 5115 adjacent to the fourth side surface 5114, a seventh portion 5132 extending from at least a portion of the sixth portion 5131 to at least a portion of the edge area 5115 adjacent to the first side surface 5111, an eighth portion 5133 extending from at least a portion of the sixth portion 5131 and disposed through the edge area 5115 adjacent to the third side surface 5113, a ninth portion extending 5134 from at least a portion of the sixth portion 5131 to the recess 5117, and a tenth portion 5135 extending from at least a portion of the ninth portion 5134 to at least a portion of the island area 5116. According to an embodiment, the second conductive member 513 may include a pair of fourth conductive terminals 5136 extending from at least a portion of the ninth portion 5134 toward the first side surface 5111 and the third side surface 5113, respectively. According to an embodiment, the second conductive member 513 may include a pair of fifth conductive terminals 5137 extending from at least a portion of the seventh portion 5132 and at least a portion of the eighth portion 5133, respectively, toward the island area 5116.

According to various embodiments, at least a portion of the second conductive member 513 may be molded in the base member 5110 through insert injection molding so as to be disposed inside the base member 5110 and to be invisible to the naked eye. For example, at least a portion of each of the sixth portion 5131, the seventh portion 5132, the eighth portion 5133, and the tenth portion 5135 may be molded inside the base member 5110 through insert injection molding. According to an embodiment, at least a portion of each of the sixth portion 5131, the seventh portion 5132, and the eighth portion 5133 may include an exposed portion 5131a, 5132a, or 5133a, which extends through the second surface 5102 of the base member 5110 to be exposed. According to an embodiment, the base member 5110 may be fixed in such a manner that the exposed portions 5131a, 5132a, and 5133a are soldered at corresponding positions of the printed circuit board (e.g., the printed circuit board 420 in FIG. 5).

According to various embodiments, since the pair of fourth conductive terminals 5136 and the pair of fifth conductive terminals 5137 have substantially the same shape and function as the pair of second conductive terminals 5126 and the pair of third conductive terminals 5127 of the first conductive member 512 described above, a description thereof may be omitted.

Figure 6C:
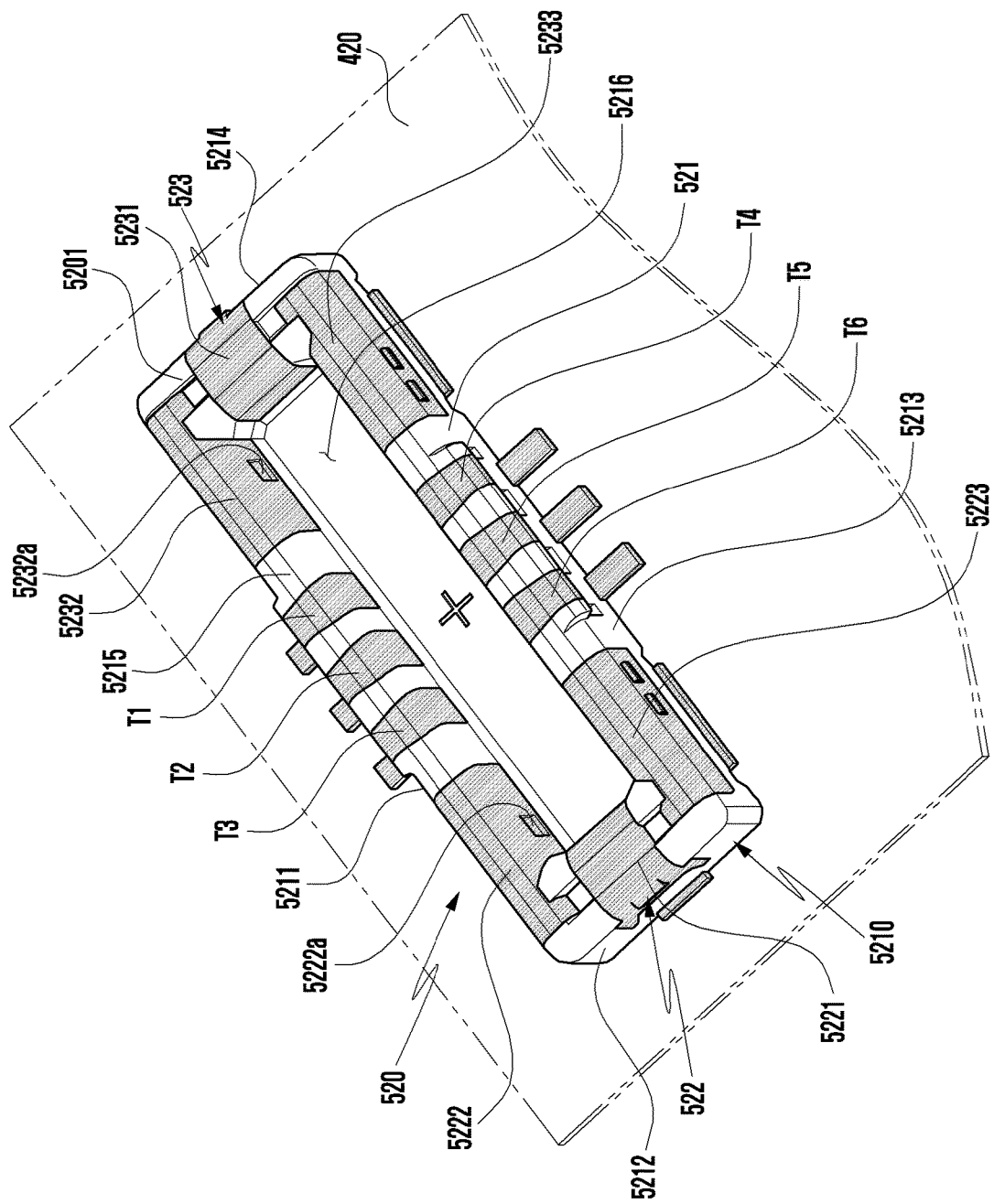
FIG. 6C is a perspective view illustrating a connector according to various embodiments of the disclosure.

FIG. 6C is a perspective view illustrating the connector 520 according to various embodiments of the disclosure.

Referring to FIG. 6C, the connector 520 may include a connector base 5210 including a first connector surface 5201 facing the receptacle 510, a second connector surface 5202 facing away from the receptacle 510, and a connector side surface 521 surrounding the first connector surface 5201 and the second connector surface 5202. According to an embodiment, the connector base 5210 may be a molded structure capable of being molded through insert injection molding. According to an embodiment, the connector base 5210 may be made of an insulative material. According to an embodiment, the connector side surface 521 may include a first connector side surface 5211 having a third length, a second connector side surface 5212 extending in a vertical direction from the first connector side surface 5211 and having a fourth length shorter than the third length, a third connector side surface 5213 extending from the second connector side surface 5212 parallel to the first connector side surface 5211 and having the third length, and a fourth side surface 5214 extending from the third connector side surface 5213 parallel to the second connector side surface 5212 and having the fourth length. According to an embodiment, the connector base 5210 may include an island-seating portion 5216 having a predetermined depth from the first connector surface 5201 toward the second connector surface 5202. According to an embodiment, the connector 520 may include an edge area 5215 defined by the island-seating portion 5216. According to an embodiment, the connector 520 may include multiple connector terminals T1 to T6. According to an embodiment, among the multiple connector terminals T1 to T6, some connector terminals T1 to T3 may be sequentially disposed through the first connector side surface 5211 and the edge area 5215. According to an embodiment, among the multiple connector terminals T1 to T6, some connector terminals T4 to T6 may be sequentially disposed through the third connector side surface 5213 and the edge area 5215. Accordingly, when the connector 520 is connected to the receptacle (e.g., the receptacle 510 in FIG. 6A), the island area of the receptacle (e.g., the island area 5116 in FIG. 6A) is seated on the island-seating portion 5216 of the connector 520, and the edge area 5215 of the connector 520 may be coupled to and seated in the recess (e.g., the recess 5117 in FIG. 6A) of the receptacle (e.g., the receptacle 510 in FIG. 6A). At the same time, the multiple conductive terminals C1 to C6 of the receptacle 510 may be electrically connected to the multiple connector terminals T1 to T6 of the connector 520 by being in physical contact with the multiple connector terminals T1 to T6.

According to various embodiments, the connector 520 may include a third conductive member 522 and a fourth conductive member 523, which are respectively disposed on opposite sides of the connector base 5210, with the multiple connector terminals T1 to T6 interposed therebetween. According to an embodiment, when the connector 520 is coupled to the receptacle (e.g., the receptacle 510 in FIG. 6A), the third conductive member 523 may be electrically connected to the first conductive member (e.g., the first conductive member 512 in FIG. 6A), and the fourth conductive member 522 may be electrically connected to the second conductive member (e.g., the second conductive member 513 in FIG. 6A). For example, the third conductive member 522 and the fourth conductive member 523 may have substantially the same shape, and may be disposed symmetrically with each other, with the multiple connector terminals T1 to T6 interposed therebetween.

According to various embodiments, the third conductive member 522 may include a first conductive portion 5221 at least partially disposed along the second connector side surface 5212 and the edge area 5215 adjacent thereto, a second conductive portion 5222 extending from at least a portion of the first conductive portion 5221 to a portion of the edge area 5215 adjacent to the first connector side surface 5211, and a third conductive portion 5223 extending from at least a portion of the first conductive portion 5221 to a portion of the edge area 5215 adjacent to the third connector side surface 5213. According to an embodiment, the first conductive portion 5221 may be disposed to extend from at least a portion of the second connector side surface 5212 to the inner surface of the island-seating portion 5216 through the edge area 5215. According to an embodiment, the second conductive portion 5222 may be disposed to extend from at least a portion of the first connector side surface 5211 to the inner surface of the island-seating portion 5216 through the edge area 5215. According to an embodiment, the third conductive portion 5223 may be disposed to extend from at least a portion of the third connector side surface 5213 to the inner surface of the island-seating portion 5216 through the edge area 5215.

According to various embodiments, the fourth conductive member 523 may include a fourth conductive portion 5231 at least partially disposed along the fourth connector side surface 5214 and the edge area 5215 adjacent thereto, a fifth conductive portion 5232 extending from at least a portion of the fourth conductive portion 5231 to a portion of the edge area 5215 adjacent to the first connector side surface 5211, and a sixth conductive portion 5233 extending from at least a portion of the fourth conductive portion 5231 to a portion of the edge area 5215 adjacent to the third connector side surface 5213. According to an embodiment, the fourth conductive portion 5231 may be disposed to extend from at least a portion of the fourth connector side surface 5214 to the inner surface of the island-seating portion 5216 through the edge area 5215. According to an embodiment, the fifth conductive portion 5232 may be disposed to extend from at least a portion of the first connector side surface 5211 to the inner surface of the island-seating portion 5216 through the edge area 5215. According to an embodiment, the sixth conductive portion 5233 may be disposed to extend from at least a portion of the third connector side surface 5213 to the inner surface of the island-seating portion 5216 through the edge area 5215.

According to various embodiments, when the connector 520 is coupled to the receptacle (e.g., the receptacle 510 in FIG. 6A), the first portion (e.g., the first portion 5121 in FIG. 6A) of the first conductive member (e.g., the first conductive member 512 in FIG. 6A), the second portion (e.g., the second portion 5122 in FIG. 6A), and the third portion (e.g., the third portion 5123 in FIG. 6A) may be brought into physical contact with the first conductive portion 5221, the second conductive portion 5222, and the third conductive portion 5223 of the third conductive member 522 of the connector 520, respectively. At the same time, the pair of second conductive terminals (e.g., the second conductive terminals 5126 in FIG. 6A) may be brought into physical contact with the second conductive portion 5222 disposed in the first connector side surface 5211 and the third conductive portion 5223 disposed in the third connector side surface 5213, respectively, and the pair of third conductive terminals (e.g., the third conductive terminals 5127 in FIG. 6A) may be respectively brought into physical contact with the second conductive portion 5222 and the third conductive portion 5223 extending to the island-seating portion 5216.

According to various embodiments, when the connector 520 is coupled to the receptacle (e.g., the receptacle 510 in FIG. 6A), the sixth portion (e.g., the sixth part 5131 in FIG. 6A), the seventh portion (e.g., the seventh portion 5132 in FIG. 6A), and the eighth portion (e.g., the eighth portion 5133 in FIG. 6A) of the second conductive member (e.g., the second conductive member 513 in FIG. 6A) may be brought into physical contact with the fourth conductive portion 5231, the fifth conductive portion 5232, and the sixth conductive portion 5233 of the fourth conductive member 523 of the connector 520, respectively. At the same time, the pair of fourth conductive terminals (e.g., the fourth conductive terminals 5136 in FIG. 6A) may be brought into physical contact with the fifth conductive portion 5232 disposed in the first connector side surface 5211 and the sixth conductive portion 5233 disposed in the third connector side surface 5213, respectively, and the pair of fifth conductive terminals (e.g., the fifth conductive terminals 5137 in FIG. 6A) may be respectively brought into physical contact with the fifth conductive portion 5232 and the sixth conductive portion 5233 extending to the island-seating portion 5216.

Figure 7A:
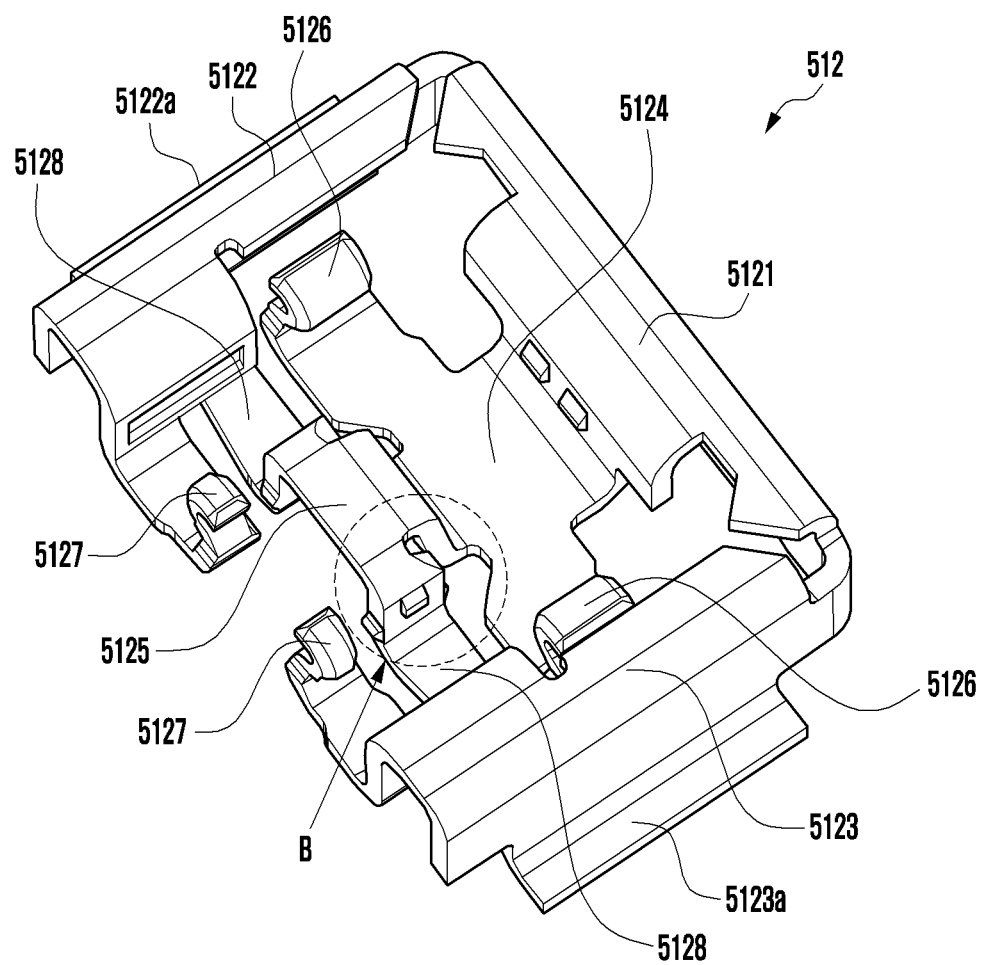
FIG. 7A is a perspective view illustrating a first conductive member disposed in a receptacle according to various embodiments of the disclosure.
Figure 7B:
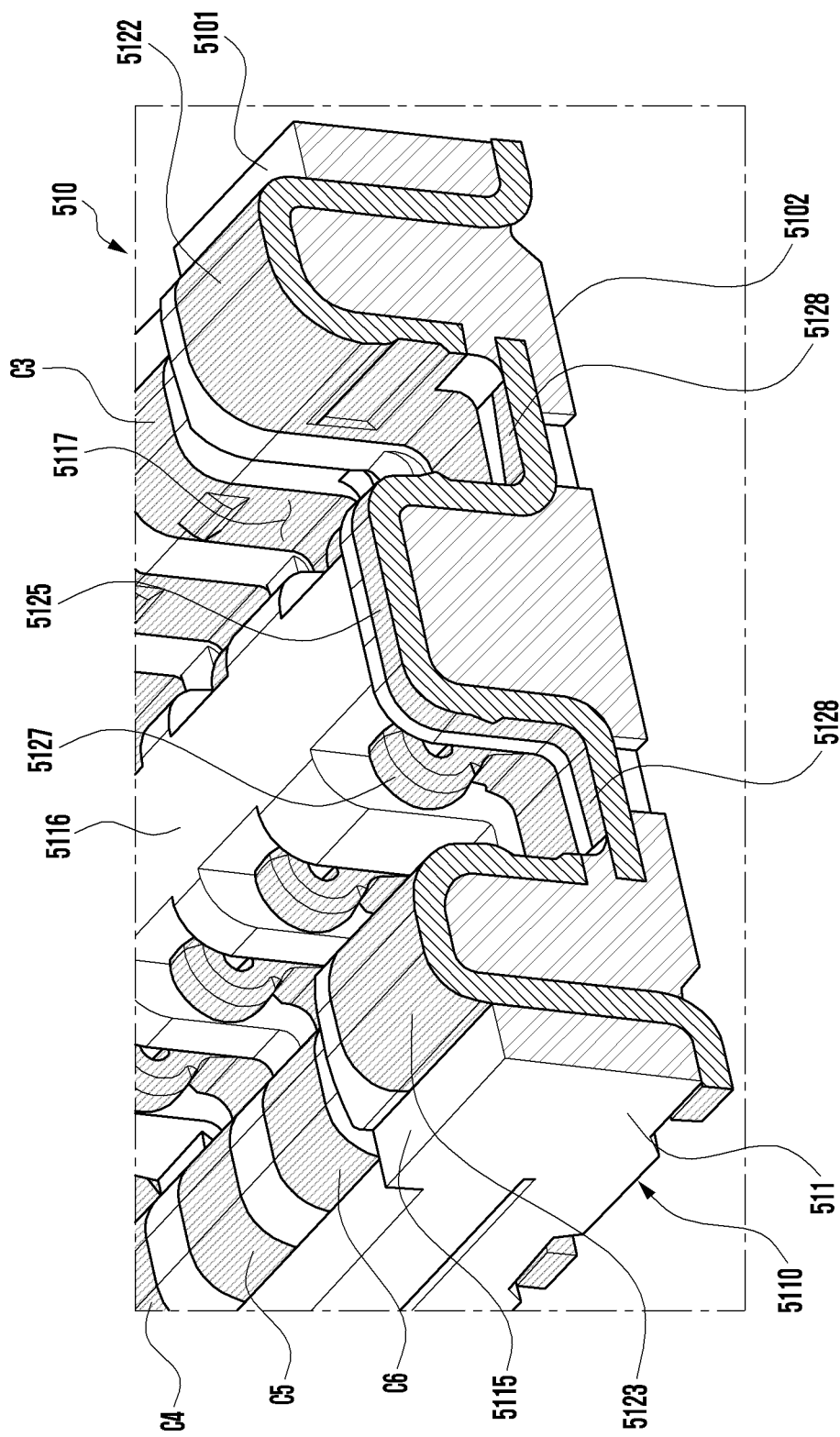
FIG. 7B is a partial cross-sectional perspective view of the receptacle viewed from line A-A' of FIG. 6B according to various embodiments of the disclosure.

FIG. 7A is a perspective view illustrating the first conductive member 512 disposed in the receptacle 510 according to various embodiments of the disclosure. FIG. 7B is a partial cross-sectional perspective view of the receptacle 510 viewed from line A-A' of FIG. 6B according to various embodiments of the disclosure.

The first conductive member 512 of FIG. 7A differs from the second conductive member 513 of FIG. 6B only in the arrangement position thereof on the base member 5110, and has substantially the same configuration as the second conductive member 513 of FIG. 6B. The first conductive member 512 and the second conductive member 513 may be disposed to be symmetrical to each other. Therefore, a detailed description of the second conductive member 513 may be omitted.

Referring to FIG. 7A, the second conductive member 512 may include a first portion 5121, a second portion 5122 extending from one side of the first portion 5121, a third portion 5123 extending from the other side of the first portion 5121, a fourth portion 5124 extending from a substantially central portion of the first portion 5121 to a recess (e.g., the recess 5117 in FIG. 6A), and a fifth portion 5125 extending from the fourth portion to the island area (e.g., the island area 5116 in FIG. 6A). According to an embodiment, the first portion 5121, the second portion 5122, and the third portion 5123 may be disposed on the first surface (e.g., the first surface 5101 in FIG. 6A) (e.g., the top surface) adjacent to the base member (e.g., the second side surface (e.g., the second side surface 5112 in FIG. 6A), the first side surface (e.g., the first side surface 5111 in FIG. 6A), and the third side surface (e.g., the third side surface 5113 in FIG. 6A) of the base member (e.g., the base member 5110 in FIG. 6A)), and may be at least partially molded inside the base member (e.g., the base member 5110 in FIG. 6A) through insert injection molding. According to an embodiment, the fourth portion 5124 may be bent downward (e.g., in the direction in which the second surface 5102 of the base member 5110 in FIG. 6A is oriented) from the first portion 5121 so as to be seated in the recess (e.g., the recess 5117 in FIG. 6A) of the base member (e.g., the base member 5110 in FIG. 6A). According to an embodiment, the fifth portion 5125 may be bent upward (e.g., in the direction in which the first surface 5101 of the base member 5110 in FIG. 6A is oriented) from the fourth portion 5124 to at least a portion of the island area (e.g., the island area 517 in FIG. 6A) so as to be disposed on at least a portion of the island area (e.g., the island area 5116 in FIG. 6A) of the base member (e.g., the base member 5110 in FIG. 6A).

According to various embodiments, the first conductive member 512 may include a pair of second conductive terminals 5126 extending from the fourth portion 5124 toward the first portion 5121 and the third portion 5123, respectively. According to an embodiment, the first conductive member 512 may include a pair of third conductive terminals 5127 extending from the second portion 5122 toward the island area (e.g., the island area 5116 in FIG. 6A) and extending from the third portion toward the island area (e.g., the island area 5116 in FIG. 6A) to face each other. According to an embodiment, the pair of second conductive terminals 5126 may be spaced apart from each other to have a distance therebetween and may have elasticity so as to be capable of accommodating the connector base (e.g., the connector base 5210 in FIG. 6C) of the connector (e.g., the connector 520 in FIG. 6C) and capable of pressing the outer surface of the same, and the pair of third conductive terminals 5127 may be spaced apart from each other to have a distance therebetween and may have elasticity so as to be capable of being accommodated in the island-seating portion (e.g., the island-seating portion 5216 in FIG. 6C) of the connector base (e.g., the connector base 5210 in FIG. 6C) and capable of pressing the inner surface of the island-seating portion (e.g., the island-seating portion 5216 in FIG. 6C). According to an embodiment, the fifth portion 5125 may be disposed between the second conductive terminals 5126 and the third conductive terminals 5127.

Referring to FIGS. 7A and 7B, the first conductive member 512 may include a pair of support portions 5128 extending from the fifth conductive member 5125 toward the first portion 5121 and the third portion 5123, respectively. According to an embodiment, the support portions 5128 may be disposed to be spaced apart from the first portion 5121 and the third portion 5123. In another embodiment, the support portions 5128 may be connected to the first portion 5121 and the third portion 5123, respectively. According to an embodiment, at least a portion of the support portions 5128 may be molded in the base member 5110 through insert injection molding. According to an embodiment, the support portions 5128 may be molded through insert injection molding to a position at which the support portions 5128 overlap at least a portion of the first portion 5121 and the third portion 5123 when the first surface of the base member 5110 is viewed from above, whereby the first conductive member 512 can be supported so as to be firmly fixed to the base member 5110.

Figure 7C:
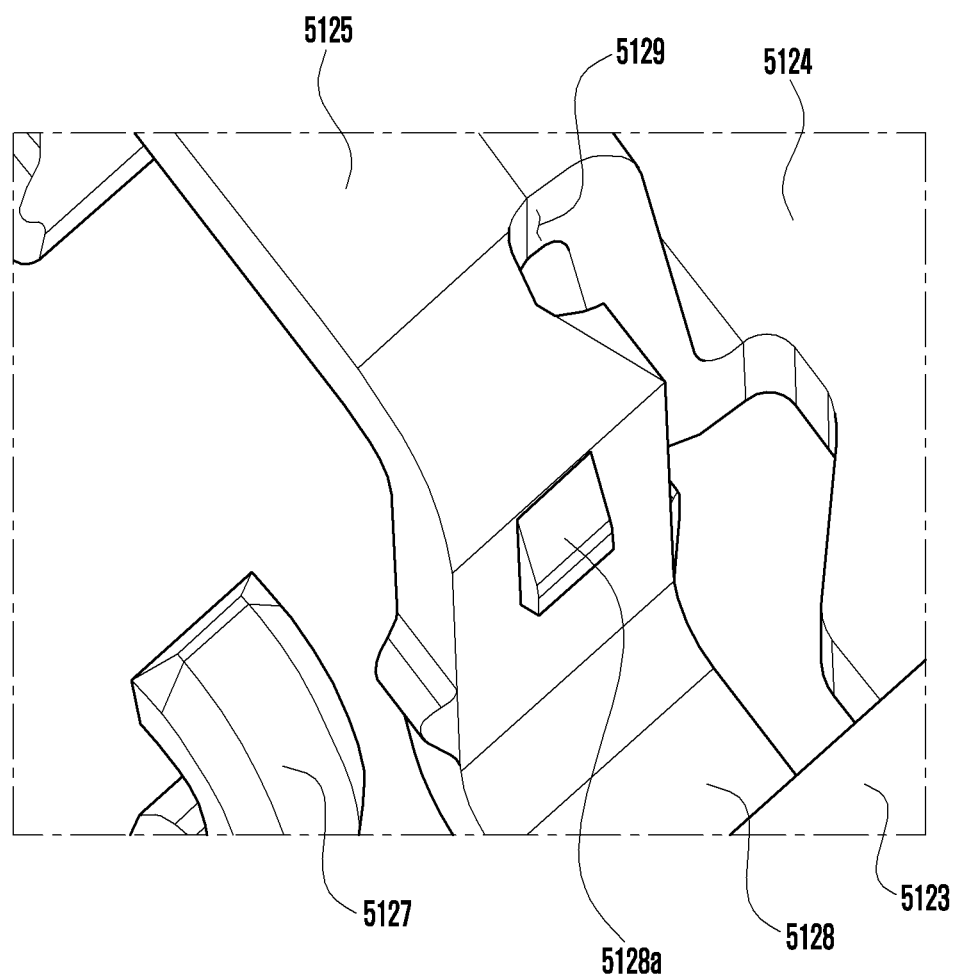
FIG. 7C is a partial perspective view illustrating in detail area B of FIG. 7A according to various embodiments of the disclosure.

FIG. 7C is a partial perspective view illustrating in detail area B of FIG. 7A according to various embodiments of the disclosure.

Referring to FIG. 7C, the first conductive member 512 may further include a notch area 5129 formed at a point where the fifth portion 5125, the fourth portion 5124, and the support portion 5128 meet each other. According to an embodiment, the notch area 5129 may be provided in order to prevent unnecessary deformation and to improve bendability when the first conductive member 512 is bent from the fifth portion 5125 to the fourth portion 5124 and the support portion 5128. According to an embodiment, since the area of the portion that extends from the fifth portion 5125 to the support portion 5128 is provided to be as large as possible through the notch area 5129, it is possible to induce a stable electrical connection with a connector (e.g., the connector 520 in FIG. 6C). Although not denoted by a reference numeral, the first conductive member 512 may include a notch area extending from the fifth portion 5125 toward the fourth portion 5124 and the first portion 5121, in which the point at which the notch area meets the support portions 5128 is also formed in substantially the same manner.

According to various embodiments, the first conductive member 512 may include at least one protrusion 5128a protruding outward from at least a portion between the fifth portion 5125 and the support portion 5128. According to one embodiment, when a connector (e.g., the connector 520 in FIG. 6C) is coupled to the receptacle (e.g., the receptacle 510 in FIG. 6A), the at least one protrusion 5128a is capable of being seated on a protrusion-seating portion (e.g., the protrusion-seating portion 5232a in FIG. 6C) provided at a corresponding position of the connector, thereby inducing firm mutual coupling and inducing stable electrical connection through the increase in the contact area. According to an embodiment, the mutual coupling configuration of the protrusion 5128a and the protrusion-seating portion 5232a may also be disposed in at least one of contact areas between the first conductive terminals (e.g., the first conductive terminals C1 to C6 in FIG. 6A), the first conductive member (e.g., the first conductive member 512 in FIG. 6A), and the second conductive member (e.g., the second conductive member 513 in FIG. 6A) of the receptacle (e.g., the receptacle 510 in FIG. 6A) and the connector terminals (e.g., the connector terminals T1 to T6 in FIG. 6C), the third conductive member (e.g., the third conductive member 522 in FIG. 6C), and the fourth conductive member (e.g., the fourth conductive member 523 in FIG. 6C) of the connector (e.g., the connector 520 in FIG. 6C).

According to various embodiments, an electronic device (e.g., the electronic device 400 in FIG. 4) may include: a housing (e.g., the housing 410 in FIG. 4); a printed circuit board (PCB) (e.g., the printed circuit board 420 in FIG. 4) disposed inside the housing; and a receptacle (e.g., the receptacle 510 in FIG. 6A) mounted on the printed circuit board, wherein the receptacle may include: a base structure (e.g., the base structure 5110 in FIG. 6A) including a first surface (e.g., the first surface 5101 in FIG. 6A) facing away from the printed circuit board, a second surface (e.g., the second surface 5102 in FIG. 6A) facing away from the first surface and mounted on the printed circuit board, and a side surface (e.g., the side surface 511 in FIG. 6A) surrounding a space between the first surface and the second surface, wherein the side surface may include: a first side surface (e.g., the first side surface 5111 in FIG. 6A), a second side surface (e.g., the second side surface 5112 in FIG. 6A) extending from the first side surface in a vertical direction, a third side surface (e.g., the third surface 5113 in FIG. 6A) extending from the second side surface in a direction parallel to the first side surface, and a fourth side surface (e.g., the fourth side surface 5114 in FIG. 6A) extending from the third side surface in a direction parallel to the second side surface, and wherein the base structure may include an edge area (e.g., the edge area 5115 in FIG. 6A) and an island area (e.g., the island area 5116) defined by a recess (e.g., the recess 5117 in FIG. 6A) having a predetermined depth from the first surface toward the second surface; multiple first conductive terminals (e.g., the first conductive terminals C1 to C6 in FIG. 6A) disposed side by side between the first side surface and the island area and between the third side surface and the island area, respectively; a first conductive member (e.g., the first conductive member 512 in FIG. 6A) disposed between the first multiple conductive terminals and the second side surface, wherein the first conductive member may include: a first portion (e.g., the first portion 5121 in FIG. 6A) disposed in the edge area adjacent to the second side surface, a second portion (e.g., the second portion 5122 in FIG. 6A) extending from at least a portion of the first portion to a portion of the edge area adjacent to the first side surface, a third portion (e.g., the third portion 5123 in FIG. 6A) extending from at least a portion of the first portion to a portion of the edge area adjacent to the third side surface, a fourth portion (e.g., the fourth portion 5124 in FIG. 6A) extending from at least a portion of the first portion to the recess, a fifth portion (e.g., the fifth portion 5125 in FIG. 6A) extending from at least a portion of the fourth portion to at least a portion of the island area, a pair of second conductive terminals (e.g., the second conductive terminals 5126 in FIG. 6A) extending from at least a portion of the fourth portion toward the first side surface and the second side surface, respectively, and a pair of third conductive terminals (e.g., the third conductive terminals 5127 in FIG. 6A) extending from the second portion and the third portion, respectively, toward the island area, and wherein, when a connector (e.g., the connector 520 in FIG. 6C) is connected to the receptacle, the second conductive terminals and the third conductive terminals are disposed to provide pressing forces to the connector in opposite directions.

According to various embodiments, the electronic device may further include: a second conductive member (e.g., the second conductive member 513) disposed between the first multiple conductive terminals and the fourth side surface, wherein the second conductive member may include: a sixth portion (e.g., the sixth portion 5131 in FIG. 6A) disposed in the edge area adjacent to the fourth side surface, a seventh portion (e.g., the seventh portion 5132 in FIG. 6A) extending from at least a portion of the sixth portion to a portion of the edge area adjacent to the first side surface, an eighth portion (e.g., the eighth portion 5133 in FIG. 6A) extending from at least a portion of the sixth portion to a portion of the edge area adjacent to the third side surface, a ninth portion (e.g., the ninth portion 5134 in FIG. 6A) extending from at least a portion of the sixth portion to the recess, a tenth portion (e.g., the tenth portion 5135 in FIG. 6A) extending from at least a portion of the ninth portion to at least a portion of the island area, a pair of fourth conductive terminals (e.g., the fourth conductive terminals 5136 in FIG. 6A) extending from at least a portion of the ninth portion toward the first side surface and the second side surface, respectively, and a pair of fifth conductive terminals (e.g., the fifth conductive terminals 5137 in FIG. 6A) extending from the seventh portion and the eighth portion, respectively, toward the island area, and wherein, when the connector is connected to the receptacle, the fourth conductive terminals and the fifth conductive terminals may be disposed to provide pressing forces to the connector in opposite directions.

According to various embodiments, the first conductive terminals, the first conductive member, and the second conductive member may be molded in the base structure, which is made of an insulative material, through insert injection molding.

According to various embodiments, at least a portion of the first conductive terminals, the first conductive member, and the second conductive member may be exposed through the second surface of the base structure, and the exposed portion may be electrically connected to the printed circuit board.

According to various embodiments, at least a portion of the fourth portion may be disposed in the recess, and at least a portion of the fifth portion may be disposed in the island area to be exposed.

According to various embodiments, the pair of second conductive terminals may be arranged at an interval for pressing the outer surface of the connector when the connector is coupled with the receptacle.

According to various embodiments, the connector may include an island-seating portion (e.g., the island-seating portion 5216 in FIG. 6C) configured to accommodate the island area, and the pair of third conductive terminals may be arranged at an interval for pressing the inner surface of the island-seating portion when the connector is coupled to the receptacle.

According to various embodiments, the fifth portion may be disposed between the second conductive terminals and the third conductive terminals.

According to various embodiments, the electronic device may further include a pair of support portions (e.g., the support portions 5128 in FIG. 6B) extending from the fourth portion toward the second portion and the third portion, respectively.

According to various embodiments, the pair of support portions may include areas overlapping at least the second portion and the third portion when the first surface is viewed from above, the overlapping areas being molded in the base member through insert injection molding.

According to various embodiments, the support portions may be connected to the second portion and/or the third portion.

According to various embodiments, a corner portion in which the fifth portion, the fourth portion, and the support portion meet each other may include a notch area (e.g., the notch area 5129 in FIG. 7C) that is depressed inward.

According to various embodiments, at least a portion of the first conductive terminals, the first conductive member, and the second conductive member may include at least one protrusion (e.g., the protrusion 5128a in FIG. 7C) protruding outward, and the protrusion may be seated in a protrusion-seating groove (e.g., the protrusion-seating groove 5232a in FIG. 6C) formed at a corresponding position in the connector when the connector is coupled with the receptacle.

According to various embodiments, the electronic device may further include a display (e.g., the display 101 in FIG. 1) disposed in the internal space of the housing so as to be visible from the outside through at least a portion of the housing.

According to various embodiments, the electronic device may further include a battery (e.g., the battery 430 in FIG. 4) disposed in an internal space of the housing, wherein the receptacle and the connector may electrically connect the battery to the printed circuit board.

According to various embodiments, a receptacle to be coupled with a connector may include: a base structure (e.g., the base structure 5110 in FIG. 6A) including a first surface (e.g., the first surface 5101 in FIG. 6A) facing away from the printed circuit board, a second surface (e.g., the second surface 5102 in FIG. 6A) facing away from the first surface and mounted on the printed circuit board, and a side surface (e.g., the side surface 511 in FIG. 6A) surrounding a space between the first surface and the second surface, wherein the side surface may include: a first side surface (e.g., the first side surface 5111 in FIG. 6A), a second side surface (e.g., the second side surface 5112 in FIG. 6A) extending from the first side surface in a vertical direction, a third side surface (e.g., the third surface 5113 in FIG. 6A) extending from the second side surface in a direction parallel to the first side surface, and a fourth side surface (e.g., the fourth side surface 5114 in FIG. 6A) extending from the third side surface in a direction parallel to the second side surface, and wherein the base structure may include an edge area (e.g., the edge area 5115 in FIG. 6A) and an island area (e.g., the island area 5116) defined by a recess (e.g., the recess 5117 in FIG. 6A) having a predetermined depth from the first surface toward the second surface; multiple first conductive terminals (e.g., the first conductive terminals C1 to C6 in FIG. 6A) disposed side by side between the first side surface and the island area and between the third side surface and the island area, respectively; a first conductive member (e.g., the first conductive member 512 in FIG. 6A) disposed between the first multiple conductive terminals and the second side surface, wherein the first conductive member may include: a first portion (e.g., the first portion 5121 in FIG. 6A) disposed in the edge area adjacent to the second side surface, a second portion (e.g., the second portion 5122 in FIG. 6A) extending from at least a portion of the first portion to a portion of the edge area adjacent to the first side surface, a third portion (e.g., the third portion 5123 in FIG. 6A) extending from at least a portion of the first portion to a portion of the edge area adjacent to the third side surface, a fourth portion (e.g., the fourth portion 5124 in FIG. 6A) extending from at least a portion of the first portion to the recess, a fifth portion (e.g., the fifth portion 5125 in FIG. 6A) extending from at least a portion of the fourth portion to at least a portion of the island area, a pair of second conductive terminals (e.g., the second conductive terminals 5126 in FIG. 6A) extending from at least a portion of the fourth portion toward the first side surface and the second side surface, respectively, and a pair of third conductive terminals (e.g., the third conductive terminals 5127 in FIG. 6A) extending from the second portion and the third portion, respectively, toward the island area, and wherein, when a connector (e.g., the connector 520 in FIG. 6C) is connected to the receptacle, the second conductive terminals and the third conductive terminals may be disposed to provide pressing forces to the connector in opposite directions.

According to various embodiments, the pair of second conductive terminals may be arranged at an interval for pressing the outer surface of the connector when the connector is coupled with the receptacle.

According to various embodiments, the connector may include an island-seating portion configured to accommodate the island area, and the pair of third conductive terminals may be arranged at an interval for pressing the inner surface of the island-seating portion when the connector is coupled to the receptacle.

According to various embodiments, the receptacle may further include a pair of support portions extending from the fourth portion toward the second portion and the third portion, respectively. The pair of support portions may include areas overlapping at least the second portion and the third portion when the first surface is viewed from above, wherein the overlapping areas may be molded in the base member through insert injection molding.

According to various embodiments, a receptacle to be coupled with a connector may include: a base structure (e.g., the base structure 5110 in FIG. 6A) including a first surface (e.g., the first surface 5101 in FIG. 6A) facing away from the printed circuit board, a second surface (e.g., the second surface 5102 in FIG. 6A) facing away from the first surface and mounted on the printed circuit board, and a side surface (e.g., the side surface 511 in FIG. 6A) surrounding a space between the first surface and the second surface, wherein the side surface may include: a first side surface (e.g., the first side surface 5111 in FIG. 6A), a second side surface (e.g., the second side surface 5112 in FIG. 6A) extending from the first side surface in a vertical direction, a third side surface (e.g., the third surface 5113 in FIG. 6A) extending from the second side surface in a direction parallel to the first side surface, and a fourth side surface (e.g., the fourth side surface 5114 in FIG. 6A) extending from the third side surface in a direction parallel to the second side surface, and wherein the base structure may include an edge area (e.g., the edge area 5115 in FIG. 6A) and an island area (e.g., the island area 5116) defined by a recess (e.g., the recess 5117 in FIG. 6A) having a predetermined depth from the first surface toward the second surface; multiple first conductive terminals (e.g., the first conductive terminals C1 to C6 in FIG. 6A) disposed side by side between the first side surface and the island area and between the third side surface and the island area, respectively; a first conductive member (e.g., the first conductive member 512 in FIG. 6A) disposed between the first multiple conductive terminals and the second side surface, wherein the first conductive member may include: a first portion (e.g., the first portion 5121 in FIG. 6A) disposed in the edge area adjacent to the second side surface, a second portion (e.g., the second portion 5122 in FIG. 6A) extending from at least a portion of the first portion to a portion of the edge area adjacent to the first side surface, a third portion (e.g., the third portion 5123 in FIG. 6A) extending from at least a portion of the first portion to a portion of the edge area adjacent to the third side surface, a fourth portion (e.g., the fourth portion 5124 in FIG. 6A) extending from at least a portion of the first portion to the recess, a fifth portion (e.g., the fifth portion 5125 in FIG. 6A) extending from at least a portion of the fourth portion to at least a portion of the island area, a pair of second conductive terminals (e.g., the second conductive terminals 5126 in FIG. 6A) extending from at least a portion of the fourth portion toward the first side surface and the second side surface, respectively, and a pair of third conductive terminals (e.g., the third conductive terminals 5127 in FIG. 6A) extending from the second portion and the third portion, respectively, toward the island area.

The receptacle may further include: a second conductive member (e.g., the second conductive member 513 in FIG. 6A) disposed between the first multiple conductive terminals and the fourth side surface, wherein the second conductive member may include: a sixth portion (e.g., the sixth portion 5131 in FIG. 6A) disposed in the edge area adjacent to the fourth side surface, a seventh portion (e.g., the seventh portion 5132 in FIG. 6A) extending from at least a portion of the sixth portion to a portion of the edge area adjacent to the first side surface, an eighth portion (e.g., the eighth portion 5133 in FIG. 6A) extending from at least a portion of the sixth portion to a portion of the edge area adjacent to the third side surface, a ninth portion (e.g., the ninth portion 5134 in FIG. 6A) extending from at least a portion of the sixth portion to the recess, a tenth portion (e.g., the tenth portion 5135 in FIG. 6A) extending from at least a portion of the ninth portion to at least a portion of the island area, a pair of fourth conductive terminals (e.g., the fourth conductive terminals 5136 in FIG. 6A) extending from at least a portion of the ninth portion toward the first side surface and the second side surface, respectively, and a pair of fifth conductive terminals (e.g., the fifth conductive terminals 5137 in FIG. 6A) extending from the seventh portion and the eighth portion, respectively, toward the island area, and wherein, when the connector (e.g., the connector 520 in FIG. 6C) is connected to the receptacle, the second conductive terminals and the third conductive terminals may be disposed to provide pressing forces to the connector in opposite directions, and when the connector is connected to the receptacle, the fourth conductive terminals and the fifth conductive terminals may be disposed to provide pressing forces to the connector in opposite directions.

Various embodiments of the disclosure disclosed in this specification and drawings are provided merely to easily describe the technical contents of the disclosure and to help understanding of the embodiments of the disclosure, and are not intended to limit the scope of the disclosure. Accordingly, the scope of the various embodiments should be construed in such a manner that, in addition to the embodiments disclosed herein, all changes or modifications derived from the technical idea of the various embodiments are included in the scope of the various embodiments of the disclosure.

The invention claimed is:

1. An electronic device comprising: a housing; a printed circuit board (PCB) disposed inside the housing; and a receptacle mounted on the printed circuit board, wherein the receptacle comprises: a base structure comprising a first surface facing away from the printed circuit board, a second surface facing away from the first surface and mounted on the printed circuit board, and a side surface surrounding a space between the first surface and the second surface, wherein the side surface comprises: a first side surface, a second side surface extending from the first side surface in a vertical direction, a third side surface extending from the second side surface in a direction parallel to the first side surface, and a fourth side surface extending from the third side surface in a direction parallel to the second side surface, and wherein the base structure comprises an edge area and an island area defined by a recess having a predetermined depth from the first surface toward the second surface; multiple first conductive terminals disposed side by side between the first side surface and the island area and between the third side surface and the island area, respectively; and a first conductive member disposed between the multiple first conductive terminals and the second side surface, wherein the first conductive member comprises: a first portion disposed in the edge area adjacent to the second side surface, a second portion extending from at least a portion of the first portion to a portion of the edge area adjacent to the first side surface, a third portion extending from at least a portion of the first portion to a portion of the edge area adjacent to the third side surface, a fourth portion extending from at least a portion of the first portion to the recess, a fifth portion extending from at least a portion of the fourth portion to at least a portion of the island area, a pair of second conductive terminals extending from at least a portion of the fourth portion toward the first side surface and the second side surface, respectively, and a pair of third conductive terminals extending from the second portion and the third portion, respectively, toward the island area, and wherein, when a connector is connected to the receptacle, the second conductive terminals and the third conductive terminals are disposed to provide pressing forces to the connector in opposite directions.

2. The electronic device of claim 1, further comprising:
a second conductive member disposed between the multiple first conductive terminals and the fourth side surface,
wherein the second conductive member comprises:
a sixth portion disposed in the edge area adjacent to the fourth side surface,
a seventh portion extending from at least a portion of the sixth portion to a portion of the edge area adjacent to the first side surface,
an eighth portion extending from at least a portion of the sixth portion to a portion of the edge area adjacent to the third side surface,
a ninth portion extending from at least a portion of the sixth portion to the recess,
a tenth portion extending from at least a portion of the ninth portion to at least a portion of the island area,
a pair of fourth conductive terminals extending from at least a portion of the ninth portion toward the first side surface and the second side surface, respectively, and
a pair of fifth conductive terminals extending from the seventh portion and the eighth portion, respectively, toward the island area, and
wherein, when the connector is connected to the receptacle, the fourth conductive terminals and the fifth conductive terminals are disposed to provide pressing forces to the connector in opposite directions.

3. The electronic device of claim 2, wherein the first conductive terminals, the first conductive member, and the second conductive member are molded in the base structure, which is made of an insulative material, through insert injection molding.

4. The electronic device of claim 2, wherein at least a portion of the first conductive terminals, the first conductive member, and the second conductive member is exposed through the second surface of the base structure, and
- the exposed portion is electrically connected to the printed circuit board.

5. The electronic device of claim 1, wherein at least a portion of the fourth portion is disposed in the recess, and at least a portion of the fifth portion is disposed in the island area to be exposed.

6. The electronic device of claim 1, wherein the pair of second conductive terminals are arranged at an interval for pressing the outer surface of the connector when the connector is coupled with the receptacle.

7. The electronic device of claim 1, wherein the connector comprises an island-seating portion configured to accommodate the island area, and
- the pair of third conductive terminals are arranged at an interval for pressing an inner surface of the island-seating portion when the connector is coupled to the receptacle.

8. The electronic device of claim 1, wherein the fifth portion is disposed between the second conductive terminals and the third conductive terminals.

9. The electronic device of claim 8, further comprising:
- a pair of support portions extending from the fourth portion toward the second portion and the third portion, respectively.

10. The electronic device of claim 9, wherein the pair of support portions comprises areas overlapping at least the second portion and the third portion when the first surface is viewed from above, the overlapping areas being molded in the base member through insert injection molding.

11. The electronic device of claim 9, wherein a corner portion in which the fifth portion, the fourth portion, and the support portion meet each other comprises a notch area that is depressed inward.

12. The electronic device of claim 2, wherein at least a portion of the first conductive terminals, the first conductive member, and the second conductive member comprises at least one protrusion protruding outward, and
- the protrusion is seated in a protrusion-seating groove formed at a corresponding position in the connector when the connector is coupled with the receptacle.

13. The electronic device of claim 1, further comprising:
- a display disposed in an internal space of the housing so as to be visible from an outside through at least a portion of the housing.

14. The electronic device of claim 1, further comprising:
- a battery disposed in an internal space of the housing,
- wherein the receptacle and the connector electrically connect the battery to the printed circuit board.

15. A receptacle to be coupled to a connector, the receptacle comprising: a base structure comprising a first surface, a second surface facing away from the first surface and mounted on a printed circuit board, and a side surface surrounding a space between the first surface and the second surface, wherein the side surface comprises: a first side surface, a second side surface extending from the first side surface in a vertical direction, a third side surface extending from the second side surface in a direction parallel to the first side surface, and a fourth side surface extending from the third side surface in a direction parallel to the second side surface, and wherein the base structure comprises an edge area and an island area defined by a recess having a predetermined depth from the first surface toward the second surface; multiple first conductive terminals disposed side by side between the first side surface and the island area and between the third side surface and the island area, respectively; and a first conductive member disposed between the multiple first conductive terminals and the second side surface, wherein the first conductive member comprises: a first portion disposed in the edge area adjacent to the second side surface, a second portion extending from at least a portion of the first portion to a portion of the edge area adjacent to the first side surface, a third portion extending from at least a portion of the first portion to a portion of the edge area adjacent to the third side surface, a fourth portion extending from at least a portion of the first portion to the recess, a fifth portion extending from at least a portion of the fourth portion to at least a portion of the island area, a pair of second conductive terminals extending from at least a portion of the fourth portion toward the first side surface and the second side surface, respectively, and a pair of third conductive terminals extending from the second portion and the third portion, respectively, toward the island area, and wherein, when a connector is connected to the receptacle, the second conductive terminals and the third conductive terminals are disposed to provide pressing forces to the connector in opposite directions.

16. The receptacle of claim 15, wherein the pair of second conductive terminals are arranged at an interval for pressing the outer surface of the connector when the connector is coupled with the receptacle.

17. The receptacle of claim 15, wherein the connector comprises an island-seating portion configured to accommodate the island area, and
- the pair of third conductive terminals are arranged at an interval for pressing an inner surface of the island-seating portion when the connector is coupled to the receptacle.

18. The receptacle of claim 15, further comprising:
- a pair of support portions extending from the fourth portion toward the second portion and the third portion, respectively,
- wherein the pair of support portions includes areas overlapping at least the second portion and the third portion when the first surface is viewed from above, the overlapping areas being molded in the base member through insert injection molding.

19. The receptacle of claim 18, wherein a corner portion in which the fifth portion, the fourth portion, and the support portion meet each other comprises a notch area that is depressed inward.

20. A receptacle to be coupled to a connector, the receptacle comprising: a base structure comprising a first surface, a second surface facing away from the first surface and mounted on a printed circuit board, and a side surface surrounding a space between the first surface and the second surface, wherein the side surface comprises: a first side surface, a second side surface extending from the first side surface in a vertical direction, a third side surface extending from the second side surface in a direction parallel to the first side surface, and a fourth side surface extending from the third side surface in a direction parallel to the second side surface, and wherein the base structure comprises an edge area and an island area defined by a recess having a predetermined depth from the first surface toward the second surface; multiple first conductive terminals disposed side by side between the first side surface and the island area and between the third side surface and the island area, respectively; a first conductive member disposed between the multiple first conductive terminals and the second side surface, wherein the first conductive member comprises: 35 a first portion disposed in the edge area adjacent to the second side surface, a second portion extending from at least a portion of the first portion to a portion of the edge area adjacent to the first side surface, a third portion extending from at least a portion of the first portion to a portion of the edge area adjacent to the third side surface, a fourth portion extending from at least a portion of the first portion to the recess, a fifth portion extending from at least a portion of the fourth portion to at least a portion of the island area, a pair of second conductive terminals extending from at least a portion of the fourth portion toward the first side surface and the second side surface, respectively, a pair of third conductive terminals extending from the second portion and the third portion, respectively, toward the island area; and a second conductive member disposed between the multiple first conductive terminals and the fourth side surface, wherein the second conductive member comprises: a sixth portion disposed in the edge area adjacent to the fourth side surface, a seventh portion extending from at least a portion of the sixth portion to a portion of the edge area adjacent to the first side surface, an eighth portion extending from at least a portion of the sixth portion to a portion of the edge area adjacent to the third side surface, a ninth portion extending from at least a portion of the sixth portion to the recess, a tenth portion extending from at least a portion of the ninth portion to at least a portion of the island area, a pair of fourth conductive terminals extending from at least a portion of the ninth portion toward the first side surface and the second side surface, respectively, and a pair of fifth conductive terminals extending from the seventh portion and the eighth portion, respectively, toward the island area, and wherein, when a connector is connected to the receptacle, the second conductive terminals and the third conductive terminals are disposed to provide pressing forces to the connector in opposite directions, and when the connector is connected to the receptacle, the fourth conductive terminals and the fifth conductive terminals are disposed to provide pressing forces to the connector in opposite directions.

\* \* \* \* \*